United States Patent
Nonoyama et al.

(10) Patent No.: US 10,836,341 B2
(45) Date of Patent: Nov. 17, 2020

(54) HEAD-PROTECTING AIRBAG DEVICE

(71) Applicant: TOYODA GOSEI CO., LTD., Kiyosu (JP)

(72) Inventors: Yoshinori Nonoyama, Kiyosu (JP); Yoshinari Takei, Kiyosu (JP)

(73) Assignee: TOYOTDA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/441,619

(22) Filed: Feb. 24, 2017

(65) Prior Publication Data

US 2017/0282839 A1 Oct. 5, 2017

(30) Foreign Application Priority Data

Mar. 31, 2016 (JP) .................. 2016-070441

(51) Int. Cl.
*B60R 21/232* (2011.01)
*B60R 21/2338* (2011.01)
(Continued)

(52) U.S. Cl.
CPC .......... *B60R 21/232* (2013.01); *B60R 21/201* (2013.01); *B60R 21/213* (2013.01);
(Continued)

(58) Field of Classification Search
CPC ... B60R 21/213; B60R 21/216; B60R 21/232; B60R 2021/2172; B60R 2012/0246; B60R 2021/0253
See application file for complete search history.

(56) References Cited

U.S. PATENT DOCUMENTS 6,367,836 B1 * 4/2002 Tanase .................. B60R 21/213
280/730.2
6,450,529 B1 * 9/2002 Kalandek .............. B60R 21/213
280/730.2
(Continued)

FOREIGN PATENT DOCUMENTS

CN 101234626 A 8/2008
JP H07-61309 A 3/1995
(Continued)

OTHER PUBLICATIONS

Office Action dated Dec. 4, 2018 in corresponding Chinese Patent Application No. 201710113063.1 (and English translation).
(Continued)

Primary Examiner — Barry Gooden, Jr.
(74) Attorney, Agent, or Firm — Posz Law Group, PLC

(57) ABSTRACT

A head-protecting airbag device includes: an airbag body; and a connecting piece which is formed of a sheet material with flexibility, wherein: the airbag body and the connecting piece constitute an airbag having a bag shape inflatable to cover an inboard side of a window of a vehicle; the airbag body includes an inboard side wall disposed on the inboard side at the time of inflation completion, an outboard side wall disposed on an outboard side, and a coupling target portion coupling the connecting piece; the coupling target portion is configured to be divided into an inboard side portion and an outboard side portion; and the root end of the connecting piece is nipped between the inboard side portion and the outboard side portion, and is coupled with the inboard side portion and the outboard side portion so as to be connected with the airbag body.

10 Claims, 19 Drawing Sheets

(51) Int. Cl.
   *B60R 21/213* (2011.01)
   *B60R 21/237* (2006.01)
   *B60R 21/231* (2011.01)
   *B60R 21/235* (2006.01)
   *B60R 21/201* (2011.01)
   *B60R 21/26* (2011.01)
   *B60R 21/261* (2011.01)

(52) U.S. Cl.
   CPC .......... *B60R 21/235* (2013.01); *B60R 21/237* (2013.01); *B60R 21/2338* (2013.01); *B60R 21/23138* (2013.01); *B60R 21/26* (2013.01); *B60R 2021/23509* (2013.01); *B60R 2021/23538* (2013.01); *B60R 2021/23576* (2013.01); *B60R 2021/2612* (2013.01)

(56) References Cited

U.S. PATENT DOCUMENTS

| | | | | |
|---|---|---|---|---|
| 7,850,198 | B2* | 12/2010 | Hayakawa | B60R 21/231 280/730.1 |
| 8,056,924 | B2* | 11/2011 | Hatfield | B60R 21/201 280/728.2 |
| 9,731,676 | B2* | 8/2017 | Nagasawa | B60R 21/2346 |
| 2003/0047919 | A1* | 3/2003 | Fujiwara | B60R 21/2346 280/730.2 |
| 2006/0017267 | A1* | 1/2006 | Fink | B60R 21/232 280/730.2 |
| 2006/0066081 | A1* | 3/2006 | Kino | B60R 21/213 280/730.2 |
| 2006/0071459 | A1* | 4/2006 | Hayakawa | B60R 21/206 280/730.1 |
| 2007/0040361 | A1* | 2/2007 | Bayley | B60R 21/232 280/730.2 |
| 2007/0164543 | A1* | 7/2007 | Fukuda | B60R 21/232 280/729 |
| 2008/0179865 | A1* | 7/2008 | Valdez | B60R 21/232 280/730.2 |
| 2009/0212540 | A1* | 8/2009 | Kamiyama | B60R 21/232 280/729 |
| 2009/0236833 | A1* | 9/2009 | Tanaka | B60R 21/232 280/730.2 |
| 2010/0096842 | A1 | 4/2010 | Valdez et al. | |
| 2014/0217707 | A1* | 8/2014 | Konishi | B60R 21/213 280/728.2 |
| 2014/0239621 | A1* | 8/2014 | Kawamura | B60R 21/213 280/730.2 |
| 2015/0151710 | A1* | 6/2015 | Tanaka | B60R 21/235 280/743.2 |
| 2015/0210242 | A1* | 7/2015 | Kashio | B60R 21/232 280/730.2 |
| 2015/0217714 | A1* | 8/2015 | Fujiwara | B60R 21/23138 280/729 |
| 2016/0362081 | A1* | 12/2016 | Nagasawa | B60R 21/2346 |
| 2019/0092266 | A1* | 3/2019 | Nonoyama | B60R 21/233 |
| 2019/0111881 | A1* | 4/2019 | Maximino | B60R 21/232 |
| 2019/0161047 | A1* | 5/2019 | Hioda | B60R 21/213 |

FOREIGN PATENT DOCUMENTS

| | | |
|---|---|---|
| JP | 2001-239905 A | 9/2001 |
| JP | 2004-189099 A | 7/2004 |
| JP | 2007-261504 A | 10/2007 |
| JP | 2007-308018 A | 11/2007 |
| JP | 2010-214969 A | 9/2010 |
| JP | 2013-133048 A | 7/2013 |

OTHER PUBLICATIONS

Office action dated Apr. 2, 2019 issued in corresponding JP patent application No. 2016-070441 (and English translation thereof).
Office Action dated Sep. 16, 2019 issued in corresponding CN patent application No. 201710113063.1 (and English translation).
Office Action dated Sep. 3, 2019 issued in corresponding JP patent application No. 2016-070441 (and English translation).

* cited by examiner

HEAD-PROTECTING AIRBAG DEVICE

CROSS-REFERENCE TO RELATED APPLICATION(S)

This application is based upon and claims the benefit of priority from Japanese Patent Application No. 2016-070441, filed on Mar. 31, 2016, the entire contents of which are incorporated herein by reference.

BACKGROUND

1. Field of the Invention

The present invention relates to a head-protecting airbag device including an airbag which has a bag shape inflatable to cover an inboard side of a window of a vehicle when an inflation gas from an inflator flows inside, and is stored on an upper peripheral side of the window as a long folding completion body formed by folding a lower periphery to be brought close to an upper periphery in a flatly-deployed state.

2. Description of the Related Art

In the related art, a head-protecting airbag device includes an airbag having an airbag body which covers an inboard side of a window at the time of inflation completion and a tension belt as a connecting piece disposed to protrude from a front end of the airbag body (for example, JP-A-2004-189099). In the conventional head-protecting airbag device, the tension belt (connecting piece) is a separate body from the airbag body, and is configured such that a root end is sewed with the front end of the airbag body by using a suture thread, and the tip is mounted in the circumferential periphery of the window.

However, in the conventional head-protecting airbag device, the root end of the tension belt is sewed by using the suture thread in the state of being overlapped on a portion of the airbag body on the front end side. Thus, when the airbag body is folded such that the lower periphery is brought close to the upper periphery, the periphery separated from the suture thread is turned up to be overlapped with the suturing portion, and the circumferential periphery of the root end of the tension belt disposed to be exposed on the surface side of the airbag body may be bulky. Therefore, there is a room for improvement in terms of folding the airbag compactly.

SUMMARY

The invention is made to solve the above-described problem, and an object thereof is to provide a head-protecting airbag device in which an airbag can be folded compactly although a connecting piece as a separate body of an airbag body is provided.

According to an aspect of the invention, there is provided a head-protecting airbag device including: an airbag body; and a connecting piece which is a separate body from the airbag body and is formed of a sheet material with flexibility, and in which a root end is connected with the airbag body, and a tip protrudes from the airbag body to be mounted in a circumferential periphery of the window, wherein: the airbag body and the connecting piece constitute an airbag having a bag shape inflatable to cover an inboard side of a window of a vehicle when an inflation gas from an inflator flows inside, the airbag being stored on an upper peripheral side of the window as a long folding completion body formed by folding a lower periphery to be brought close to an upper periphery in a flatly-deployed state; the airbag body includes an inboard side wall disposed on the inboard side at the time of inflation completion, an outboard side wall disposed on an outboard side, and a coupling target portion coupling the connecting piece; the coupling target portion is configured to be divided into an inboard side portion, which is disposed on the inboard side at the time of inflation completion to be connected from the inboard side wall, and an outboard side portion which is disposed on the outboard side to be connected from the outboard side wall; and the root end of the connecting piece is nipped between the inboard side portion and the outboard side portion, and is coupled with the inboard side portion and the outboard side portion so as to be connected with the airbag body.

In the head-protecting airbag device of the invention, the airbag includes the airbag body, and the connecting piece which is a separate body from the airbag body and has the root end connected with the airbag body. The root end of the connecting piece is coupled with the inboard side portion and the outboard side portion in the coupling target portion formed in the airbag body in the state of being nipped between the inboard side portion and the outboard side portion so as to be coupled with the coupling target portion. That is, in the head-protecting airbag device of the invention, the root end of the connecting piece is configured to be connected from the inboard side wall and the outboard side wall of the airbag body to be covered with the inboard side portion and the outboard side portion forming the coupling target portion, respectively. Therefore, the inboard side portion and the outboard side portion can suppress that the periphery separated from a portion coupled by the suture and the like in the circumferential periphery of the root end of the connecting piece turns up. For this reason, when the lower periphery is folded to be brought close to the upper periphery, the airbag body can be folded compactly by suppressing that the area of the coupling target portion coupled with the root end of the connecting piece becomes partially bulky.

Therefore, in the head-protecting airbag device of the invention, although the connecting piece is provided as a separate body from the airbag body, the airbag can be folded compactly.

In the head-protecting airbag device of the present invention, the airbag body may be formed by double-weaving.

Further, in the head-protecting airbag device of the present invention, the airbag body may be formed as a sutured airbag configured by sewing two pieces of basic fabrics in an overlapped state in a predetermined position.

Further, in the head-protecting airbag device of the present invention, in a case where the airbag body is formed by double-weaving, the coupling target portion may have a pocket shape having an insertion opening through which the root end of the connecting piece is insertable. Thus, only by inserting the root end of the connecting piece into the coupling target portion, the connecting piece can be easily positioned with respect to the airbag body, and the connecting piece is more easily coupled with the airbag body.

Further, in the head-protecting airbag device of the present invention, the connecting piece may be a tension belt in which the root end is connected with one end of the airbag body in a front and rear direction, and the tip is fixed to a body of the vehicle in the circumferential periphery of the window separated from one end of the airbag body in the front and rear direction.

The tension belt is configured such that the root end is connected with the one end of the airbag body in the front and rear direction, that is, an area overlapped mutually when the airbag body is folded. However, in the head-protecting airbag device of the invention, since the outer circumference of the root end is configured to be covered with the inboard side portion and the outboard side portion forming the coupling target portion, a partial bulkiness can be suppressed. For this reason, in the folding completion body, it can be suppressed that the end of the airbag body coupled with the root end of the tension belt becomes partially bulky.

Further, in the head-protecting airbag device of the present invention, the root end of the connecting piece may be sutured with the inboard side portion and the outboard side portion by using a suture thread to be connected with the airbag body, and one suturing portion which sews the root end with the coupling target portion may be disposed in a shape of a straight line tilted in the front and rear direction.

When the head-protecting airbag device is configured as above, although the root end of the connecting piece is sewed with the coupling target portion by using the suture, it can be prevented that the suturing portion is disposed to be overlapped mutually when the airbag body is folded such that the lower periphery is brought close to the upper periphery. Therefore, in the folding completion body, it can be further suppressed that the end of the airbag body coupled with the root end of the tension belt becomes bulky.

Further, in the head-protecting airbag device of the present invention, the suturing portion may be configured such that a tip positioned on an end side in the front and rear direction is positioned on an upper side. Then, when the inflated airbag body receives the head of an occupant at the time of inflation completion of the airbag body, and a radial tension acts while an end-side mounting portion disposed on the tension belt side in the mounting portions which mount the upper periphery of the airbag body in the upper periphery of the window is set as a center, the suturing portion which couples the root end of the tension belt with the airbag body is disposed to approximate to a tangent with respect to an arc shape centered on the end-side mounting portion. Thus, the tension can be received over almost the entire long area of the suturing portion, and a stress concentration hardly occurs on a portion of the suturing portion, which is preferable.

Further, in the head-protecting airbag device of the present invention, the root end of the connecting piece may be sutured with the inboard side portion and the outboard side portion by using a suture to be connected with the airbag body, the suturing portion which sews the root end with the coupling target portion may be configured such that a plurality of linear portions disposed to be tilted in the front and rear direction are disposed in a zigzag shape continuously in the front and rear direction, and the linear portions may be disposed not to be overlapped vertically.

When the head-protecting airbag device is configured as above, although the suturing portion is configured such that the plurality of linear portions tilted in the front and rear direction are disposed in the front and rear direction, when the airbag body is folded such that the lower periphery is brought close to the upper periphery, it can be prevented that the linear portions forming the suturing portion are disposed to be overlapped mutually. Thus, in the folding completion body, it can be further suppressed that the end of the airbag body coupled with the root end of the tension belt becomes bulky.

Further, in the head-protecting airbag device of the present invention, the connecting piece may be a mounting piece in which the root end is connected with an upper periphery of the airbag body to protrude upward from the airbag body, and the tip is mounted on the upper peripheral side of the window.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
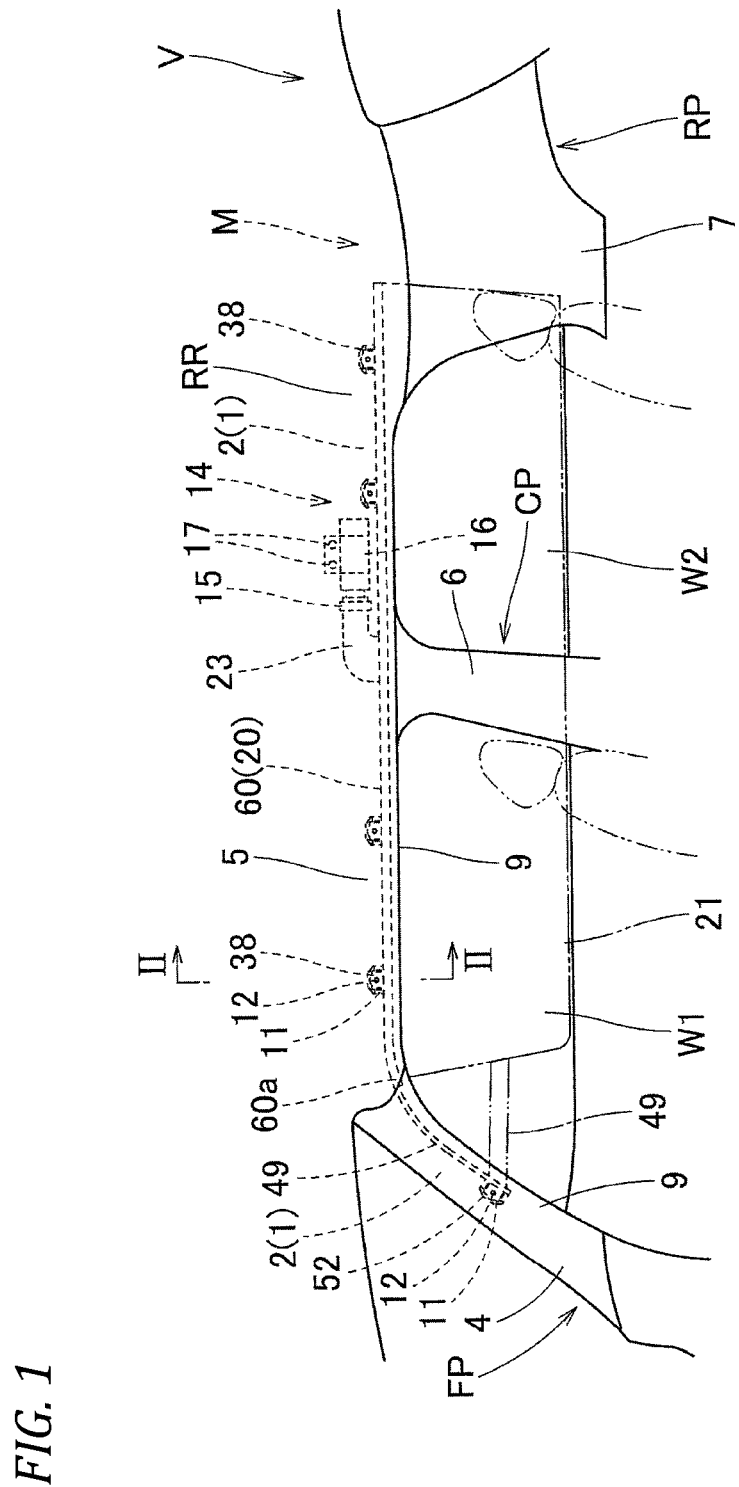
FIG. 1 is a schematic front view illustrating a head-protecting airbag device of one embodiment of the invention when viewed from an inboard side.

Hereinafter, one embodiment of the invention will be described on the basis of the drawings. As illustrated in FIG. 1, in the head-protecting airbag device M of the embodiment, the airbag 20 is stored in a folded state in the circumferential periphery on the upper peripheral side of windows (side window) W1 and W2, that is, in an area from a front pillar FP through a roof side rail RR to the upper vicinity of a rear pillar RP, and can cover the windows W1 and W2 of a vehicle V when inflated completely. As illustrated in FIG. 1, the head-protecting airbag device M includes the airbag 20, an inflator 14, mounting brackets 11 and 16, and an airbag cover 9.

Figure 2:
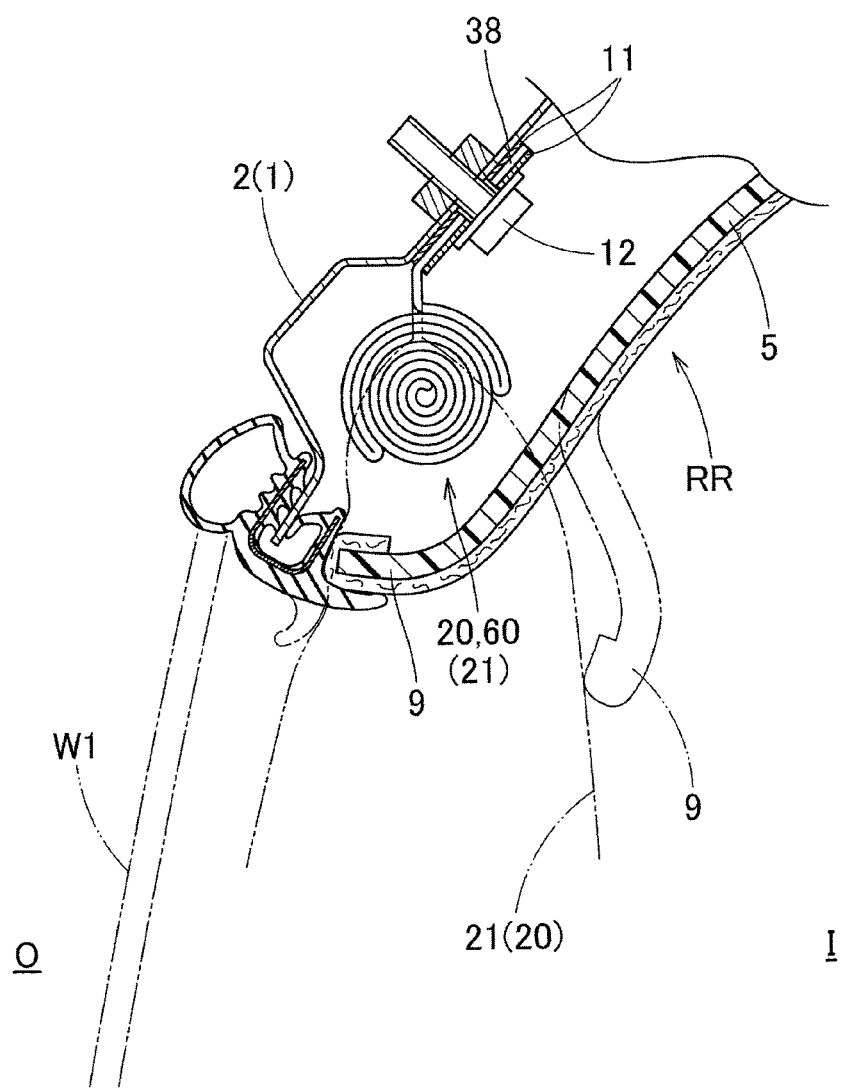
FIG. 2 is a sectional view taken along line II-II of FIG. 1.

As illustrated in FIGS. 1 and 2, the airbag cover 9 is configured from the respective lower peripheries of a front pillar garnish 4 disposed in the front pillar FP and a roof head liner 5 disposed in the roof side rail RR. The front pillar garnish 4 and the roof head liner 5 are made of synthetic resin, and are fixedly mounted on an inboard side I of an inner panel 2 of a body (vehicle body) 1. As illustrated in FIG. 2, the airbag cover 9 is configured to cover the inboard side I of the airbag 20 (folding completion body 60) stored in a folded state, and to be openable to the inboard side I when pressed by the airbag 20, so that the airbag 20 at the time of deployment can protrude downward on the inboard side.

The inflator 14 supplies an inflation gas to the airbag 20. As illustrated in FIG. 1, the inflator is a substantially cylindrical type, and a gas discharge port (not illustrated) which can discharge the inflation gas is disposed on the tip side of the inflator. The tip of the inflator 14 including the vicinity of the gas discharge port is inserted into a gas inflow port 24 (to be described later) of the airbag 20, and the inflator 14 is connected with the airbag 20 by using a clamp 15 disposed on the outer circumferential side of the gas inflow port 24. The inflator 14 is mounted in a position of the inner panel 2 above the window W2 by using the mounting bracket 16 for holding the inflator 14 and a bolt 17 for fixing the mounting bracket 16 to the inner panel 2 of the body 1 (see FIG. 1). The inflator 14 is electrically connected with a control device (not illustrated) of the vehicle V through a lead wire (not illustrated).

The mounting bracket 11 is formed of a two-sheet metal plate, and is mounted in each of the mounting portions 38 and 52 (to be described later) by nipping each of mounting portions 38 and 52 of the airbag 20 from the front and back. Each of the mounting portions 38 and 52 is fixedly mounted in the inner panel 2 of the body 1 by using the bolt 12 (see FIGS. 1 and 2).

Figure 3:
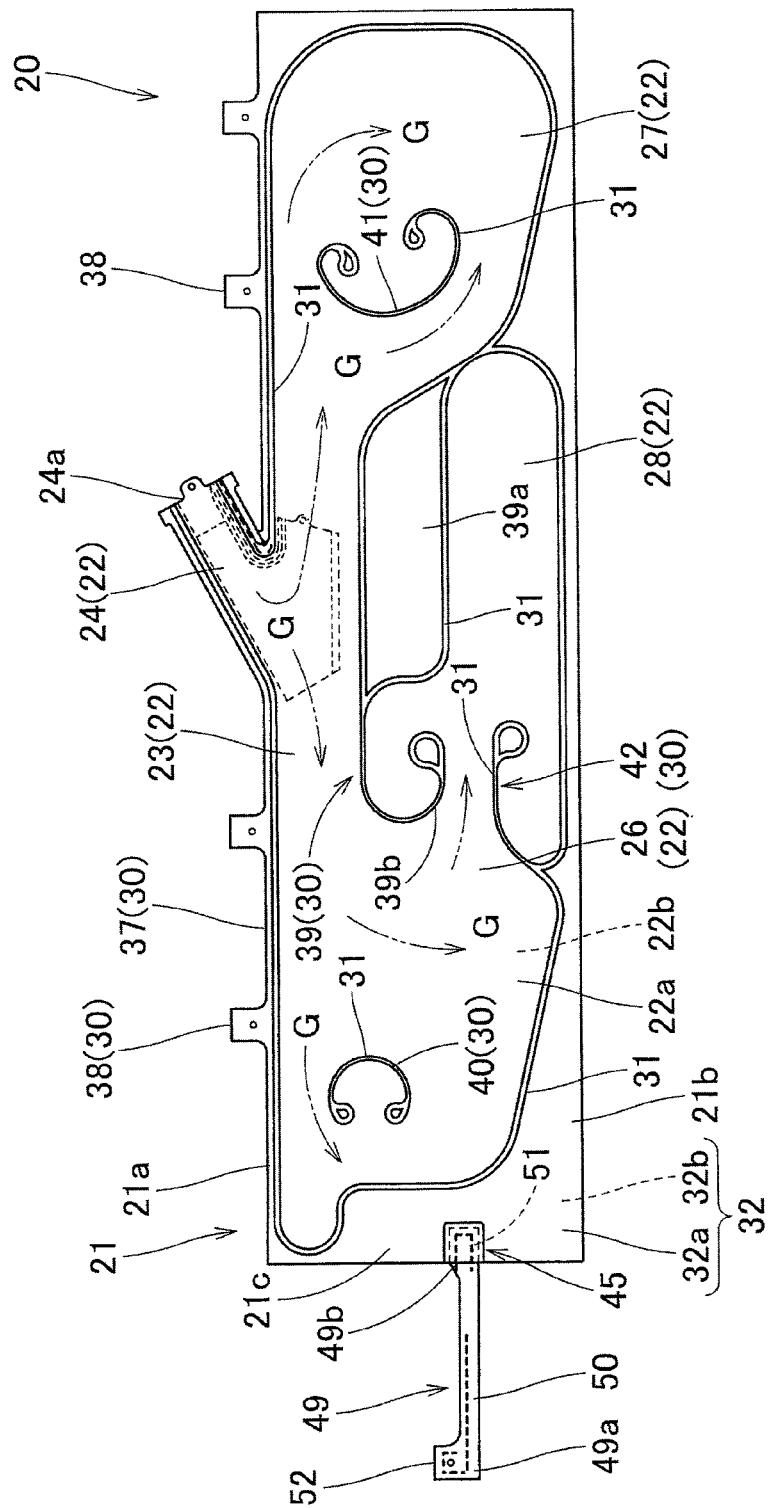
FIG. 3 is a front view illustrating a state where an airbag used in the head-protecting airbag device of the embodiment is deployed flatly.

As illustrated in a two-dot chain line of FIG. 1, the airbag 20 is configured to be deployed from the folded state and protrude downward when the inflation gas from the inflator 14 flows inside, and to cover the windows W1 and W2 and the inboard side of pillar garnishes 6 and 7 of a central pillar CP and the rear pillar RP. Specifically, the outer shape of the airbag 20 at the time of inflation completion is set to a substantially rectangular shape in which a longitudinal direction is generally along the front and rear direction, such that the airbag 20 can cover the inboard side from the window W1 to the front side of the rear pillar RP through the center pillar CP and the window W2. As illustrated in FIG. 3, the airbag 20 includes an airbag body 21 and a tension belt 49 as a connecting piece which is a separate body from the airbag body 21.

In the case of the embodiment, the airbag body 21 is integrally produced through double-weaving using a thread of polyamide, polyester, or the like. As illustrated in FIG. 3, the airbag body 21 includes a gas inflow portion 22, which is inflated when the inflation gas flows inside such that an inboard side wall 22a positioned on the inboard side at the time of inflation completion and an outboard side wall 22b positioned on the outboard side are separated, and a non-inflow portion 30 which does not admit the inflation gas to flow inside.

In the case of the embodiment, the gas inflow portion 22 includes a gas guidance path 23, the gas inflow port 24, a front-seat protecting portion 26, a rear-seat protecting portion 27, and an auxiliary inflatable portion 28 disposed to communicate with the front-seat protecting portion 26.

The gas guidance path 23 is disposed on the upper periphery 21a side of the airbag body 21 over almost the entire front and rear area of the airbag body 21 to extend generally along the front and rear direction. In the initial inflation of the airbag 20 (airbag body 21), the gas guidance path 23 is configured such that an inflation gas G discharged from the inflator 14 is guided to the front-seat protecting portion 26 and the rear-seat protecting portion 27 disposed beneath the gas guidance path 23. In the case of the embodiment, in the substantial center of the gas guidance path 23 in the front and rear direction, the gas inflow port 24 connected with the inflator 14 is disposed to communicate with the gas guidance path 23 and protrude upward from the gas guidance path 23. In the case of the embodiment, the gas inflow port 24 is formed such that the rear thereof is tilted upward with respect to the gas guidance path 23, and the rear end 24a is open such that the inflator 14 can be inserted thereinto. The gas inflow port 24 is connected to the inflator 14 by fitting the clamp 15 on the outer circumference in a state where the inflator 14 is inserted thereinto. In the airbag body 21 of the embodiment, a separate inner tube (reference numeral omitted) for improving heat resistance is disposed from the gas inflow port 24 to a portion directly below the gas inflow port 24 (see FIG. 3).

The front-seat protecting portion 26 is disposed on the side of the front seat to cover the inboard side of the window W1 at the time of inflation completion and protects a head of an occupant seated on the front seat. The rear-seat protecting portion 27 is disposed on the side of the rear seat to cover the inboard side of the window W2 at the time of inflation completion and protects a head of an occupant seated on the rear seat. The auxiliary inflatable portion 28 is disposed on a lower periphery 21b side of the airbag body 21 generally along the front and rear direction to be buried between the front-seat protecting portion 26 and the rear-seat protecting portion 27. The auxiliary inflatable portion 28 is configured such that the front end communicates with the rear lower end of the front-seat protecting portion 26, and the inflation gas flows inside through the front-seat protecting portion 26. The width dimension of an opening of a portion where the auxiliary inflatable portion 28 communicates with the front-seat protecting portion 26 is set to be small such that the inflation gas is delayed to start the flow into the auxiliary inflatable portion compared to the front-seat protecting portion 26.

Figure 4:
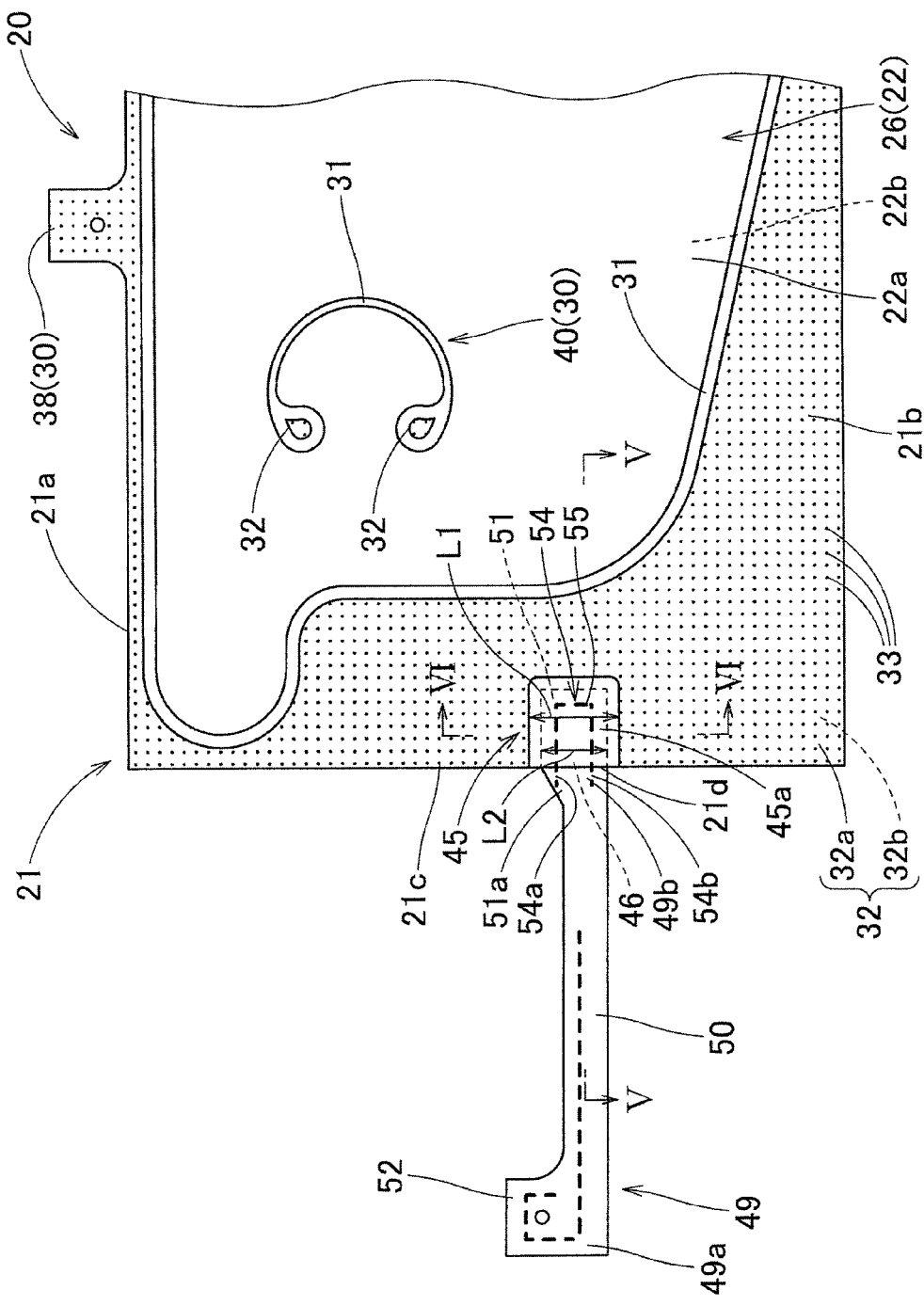
FIG. 4 is a partially enlarged front view illustrating a vicinity of a front end of the airbag of FIG. 3.
Figure 5:
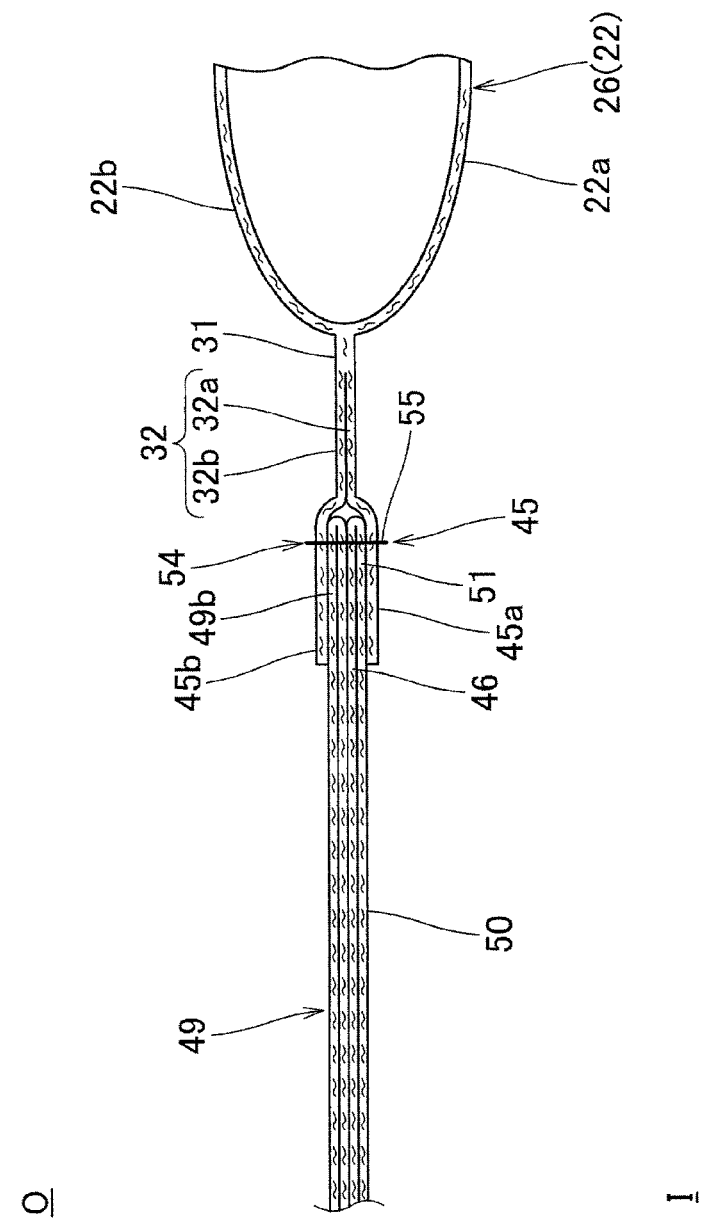
FIG. 5 is a sectional view taken along line V-V of FIG. 4.

The non-inflow portion 30 includes a circumferential peripheral boundary 31 formed to surround the gas inflow portion 22, and a general portion 32 disposed adjacent to the side of the circumferential peripheral boundary 31 separated from the gas inflow portion 22. The circumferential peripheral boundary 31 is formed over the entire circumference except the rear end 24a of the gas inflow port 24 to surround the gas inflow portion 22. The circumferential peripheral boundary 31 is configured such that the inboard side wall 22a and the outboard side wall 22b are woven into a single piece to be coupled. As illustrated in FIG. 3, the circumferential peripheral boundary 31 is configured as a substantially belt-shaped area with a constant width dimension. As illustrated in FIGS. 4 and 5, the general portion 32 is formed by two pieces of an inboard side portion 32a and an outboard side portion 32b which are woven to be separated from the circumferential peripheral boundary 31 to the inboard side I and an outboard side O. That is, the general portion 32 is formed in an overlapped shape of two pieces of the inboard side portion 32a and the outboard side portion 32b. In the general portion 32, binding portions 33 formed by folding a warp or a weft used to weave at least one portion of the inboard side portion 32a or the outboard side portion 32b into the other portion are scattered in a plurality of points. Since the inboard side portion 32a and the outboard side portion 32b are partially connected by the binding portions 33, the general portion 32 cannot be separated. In the case of the embodiment, the binding portions 33 are scattered at an interval of about 5 mm.

The non-inflow portion 30 includes a circumferential periphery 37 forming the outer circumferential periphery of the gas inflow portion 22, the mounting portion 38, a partition portion 39 and thickness regulating portions 40, 41, and 42 disposed in the gas inflow portion 22, and a pocket portion 45 as a coupling target portion coupling a root end 49b of the tension belt 49 as the connecting piece.

The circumferential periphery 37 is disposed to surround the entire outer circumferential periphery of the gas inflow portion 22 except the rear end 24a of the gas inflow port 24.

The mounting portion 38 mounts the upper periphery 21a of the airbag body 21 in the inner panel 2 of the body 1. As illustrated in FIG. 3, a plurality of mounting portions 38 (four, in the case of the embodiment) are disposed in the front and rear direction to protrude upward from the upper periphery of the circumferential periphery 37 on the upper periphery 21a side of the airbag body 21. A mounting hole (reference numeral omitted) through which a mounting bolt 12 can be inserted is formed in each of the mounting portions 38.

The partition portion 39 forms the lower periphery of the gas guidance path 23, and is formed generally along the front and rear direction in the vicinity of the center of the airbag body 21 in the front and rear direction. The partition portion 39 includes a substantially long plate-shaped portion 39a, which has a long shape along the front and rear direction, for reducing the thickness of the gas guidance path 23 and the auxiliary inflatable portion 28 disposed beneath the gas guidance path 23 at the time of inflation. The plate-shaped portion 39a is disposed between the gas guidance path 23 and the auxiliary inflatable portion 28. The partition portion 39 includes a curved portion 39b, which is formed to be curved in such a substantially reverse U shape that the tip is directed downward and rearward, on the front end side. The rear end of the partition portion 39 extends in an obliquely lower rear direction to partition the auxiliary inflatable portion 28 and the rear-seat protecting portion 27, and is connected with the lower periphery of the circumferential periphery 37.

The thickness regulating portion 40 has the outer shape formed in a substantially reverse C shape, and is disposed on the front upper end side of the front-seat protecting portion 26. The thickness regulating portion 40 is disposed to suppress that the front end portion of the gas guidance path 23 and the front-seat protecting portion 26 is inflated thickly.

In the case of the embodiment, the thickness regulating portion 40 is disposed such that about half portion protrudes above the partition portion 39 forming the lower periphery of the gas guidance path 23. The thickness regulating portion 41 is disposed in the rear-seat protecting portion 27, and the outer shape thereof is formed in a flat and substantially C shape. The thickness regulating portion 41 is disposed to suppress that a large quantity of inflation gas flows rearward to the rear-seat protecting portion 27 at the initial inflation of the airbag 20, and that the boundary between the rear-seat protecting portion 27 and the gas guidance path 23 is inflated thickly. In the airbag body 21 of the embodiment, the thickness regulating portion 41 is disposed to protrude above the partition portion 39 forming the lower periphery of the gas guidance path 23, and to protrude slightly above the thickness regulating portion 40.

The thickness regulating portion 42 is formed to protrude from the lower periphery of the circumferential periphery 37 in an obliquely upper rear direction so as to partially partition the front-seat protecting portion 26 and the auxiliary inflatable portion 28. The thickness regulating portion 42 is configured such that the rear end thereof goes into the auxiliary inflatable portion 28 generally along the front and rear direction.

Figure 6:
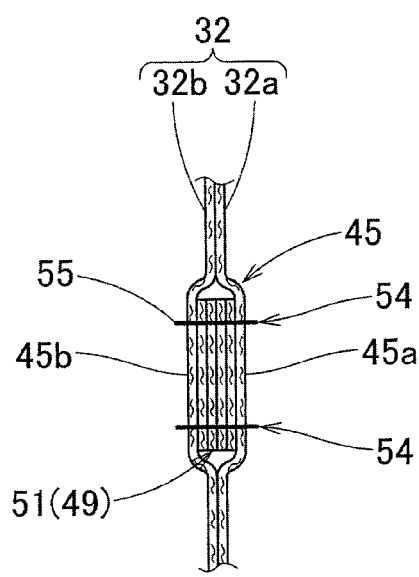
FIG. 6 is a sectional view taken along line VI-VI of FIG. 4.

The pocket portion 45 as a coupling target portion couples the root end 49b of the tension belt 49. In the case of the embodiment, as illustrated in FIGS. 3 and 4, the pocket portion 45 is disposed on the front end 21c side of the airbag body 21 in a slightly lower position from the vertical center. In the case of the embodiment, the pocket portion 45 is formed in such a pocket shape that an insertion opening 46 is formed on the front end side, and the other three sides are closed, and thus a coupling piece 51 on the root end 49b side of the tension belt 49 can be inserted thereinto. Specifically, as illustrated in FIGS. 4 to 6, the pocket portion 45 is configured to be connected from the inboard side portion 32a and the outboard side portion 32b forming the general portion 32 of the non-inflow portion 30. The pocket portion 45 includes an inboard side portion 45a disposed on the inboard side I and an outboard side portion 45b disposed on the outboard side O. The inboard side portion 45a and the outboard side portion 45b are configured to be separated from each other from a front periphery 21d of the airbag body 21. In the case of the embodiment, the pocket portion 45 is provided in an area where the binding portion is not provided in the front periphery 21d in a portion of the general portion 32 on the front end 21c side of the airbag body 21. The inboard side portion 32a (inboard side portion 45a) and the outboard side portion 32b (outboard side portion 45b) of the area are configured to be partially separated from the front periphery 21d. That is, the inboard side portion 45a and the outboard side portion 45b of the pocket portion 45 are configured to be connected from the inboard side wall 22a and the outboard side wall 22b forming the airbag body 21, respectively. The pocket portion 45 is configured such that the coupling piece 51 on the root end 49b side of the tension belt 49 can be inserted inside through the insertion opening 46 on the front end side to be nipped between the inboard side portion 45a and the outboard side portion 45b. In the case of the embodiment, the pocket portion 45 is formed in a substantially rectangular shape which is vertically wide. More specifically, in the case of the embodiment, the pocket portion 45 is configured such that the coupling piece 51 of the tension belt 49 in an overlapped shape of four pieces is inserted thereinto as described later. Thus, in order to insert the coupling piece 51 smoothly, the pocket portion 45 is configured such that the outer shape in a flatly-deployed state is slightly larger than the outer shape of the coupling piece 51.

The tension belt 49 as a connecting piece is formed, as a separate body from the airbag body 21, of the sheet material with flexibility. In the case of the embodiment, the tension belt 49 is formed of a woven fabric made of a thread of polyamide or polyester. As illustrated in the two-dot chain line of FIG. 1, the tension belt 49 is disposed generally along the front and rear direction at the time of inflation completion of the airbag body 21. The root end 49*b* is sewed with the pocket portion 45 formed on the front end 21*c* side of the airbag body 21, and the tip 49*a* protrudes from the airbag body 21 to be mounted in the circumferential periphery of the window W1. Specifically, the tip 49*a* of the tension belt 49 is fixed to the body 1 of the vehicle V in the circumferential periphery of the window W1 separated from the front end 21*c* of the airbag body 21, in the case of the embodiment, to the inner panel 2 of the body 1 in the front pillar FP.

The tension belt 49 includes a belt body 50, the coupling piece 51 disposed on the root end 49*b* side, and the mounting portion 52 disposed on the tip 49*a* side. The coupling piece 51 is configured to have a vertical width dimension larger than that of the belt body 50, and is set to have such a size that can be inserted into the pocket portion 45. Specifically, as illustrated in FIG. 4, the coupling piece 51 includes a front end portion 51*a* configured such that the upper periphery is tilted frontward and downward to the belt body 50 side. The front end portion 51*a* is configured to protrude forward from the pocket portion 45 to be inserted into the pocket portion 45. The mounting portion 52 is formed to protrude upward from the tip (front end) of the belt body 50. Similarly to the mounting portion 38 formed in the airbag body 21, the mounting portion 52 is mounted in the inner panel 2 by using the mounting bracket 11 and the bolt 12, and includes the mounting hole (reference numeral omitted) through which the mounting bolt 12 can be inserted.

Figure 7:
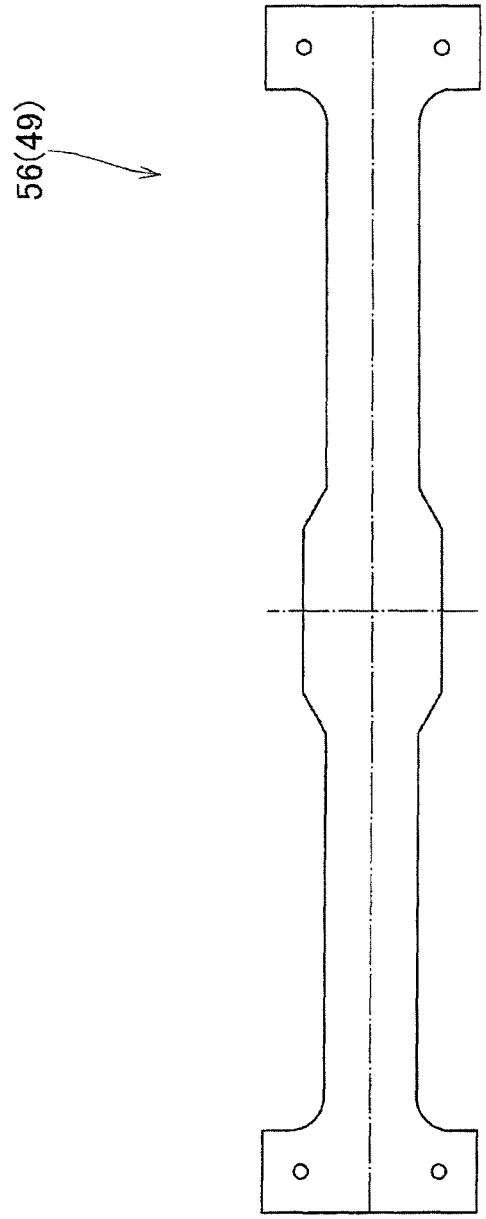
FIG. 7 is a plan view illustrating a state where a tension belt member forming a tension belt in the airbag of FIG. 4 is deployed flatly.

As illustrated in FIGS. 5 and 6, the coupling piece 51 on the root end 49*b* side is nipped between the inboard side portion 45*a* and the outboard side portion 45*b*, and is inserted into the pocket portion 45 through the insertion opening 46. In that state, the coupling piece 51 is sutured with the inboard side portion 45*a* and the outboard side portion 45*b* by using the suture thread 55 so as to be connected with the airbag body 21. In the case of the embodiment, as illustrated in FIGS. 3 and 4, the suturing portion 54 which sews the coupling piece 51 with the pocket portion 45 is formed in a substantially reverse C shape as a substantially similar shape with the pocket portion 45 in which the front side is open. In the case of the embodiment, in order to press the front periphery of the pocket portion 45 itself (the circumferential periphery of the insertion opening 46), the suturing portion 54 is formed such that terminals 54*a* and 54*b* go into the front end portion 51*a* of the coupling piece 51 protruding forward from the pocket portion 45. In the case of the embodiment, the tension belt 49 is configured in an overlapped shape of four pieces by folding a tension belt member 56 illustrated in FIG. 7 in four. Specifically, in the embodiment, the tension belt 49 is configured in such a manner that the tension belt member 56 is folded in four, and a portion from the mounting portion 52 to the belt body 50 is sewed in an overlapped shape of four pieces by using the suture.

Next, the description will be given about installing the head-protecting airbag device M of the embodiment in the vehicle V. First, in a state where the inboard side wall 22*a* and the outboard side wall 22*b* are deployed flatly to be overlapped, the airbag body 21 mounted with the tension belt 49 is folded such that the lower periphery 21*b* is brought close to the upper periphery 21*a*, thereby forming the folding completion body 60 with a long shape along the front and rear direction. In the embodiment, in the airbag body 21, a portion of the gas guidance path 23 on the upper periphery 21*a* side is bellows-folded by attaching a plurality of creases along the front and rear direction, and an area beneath the gas guidance path 23 is roll-folded such that the lower periphery 21*b* is wound to the outboard side, thereby forming the folding completion body 60 (see FIG. 2). At that time, an area of the pocket portion 45 coupled with the root end 49*b* of the tension belt 49 is folded in a roll-folding manner. After forming the folding completion body 60, a breakable wrapping materials for collapse prevention (not illustrated) is wrapped in a predetermined position around the folding completion body 60.

Thereafter, the inflator 14 mounted with the mounting bracket 16 is connected with the gas inflow port 24 of the airbag 20 by using the clamp 15, and the mounting bracket 11 is firmly fixed in each of the mounting portions 38 and 52, thereby forming an airbag assembly.

Next, the mounting brackets 11 and 16 are disposed in a predetermined position of the inner panel 2 of the body 1 and are fixed by the bolts 12 and 17, and the lead wire (not illustrated), which extends from the predetermined control device for operating an inflator, is connected to the inflator 14. The front pillar garnish 4 and the roof head liner 5 are mounted in the inner panel 2 of the body 1, and the pillar garnishes 6 and 7 are mounted in the inner panel 2 of the body 1, whereby the head-protecting airbag device M can be installed in the vehicle V.

After the head-protecting airbag device M is installed in the vehicle V, an operation signal is received from the control device (not illustrated) to operate the inflator 14, and the inflation gas discharged from the inflator 14 flows into the airbag body 21. Then, the inflating airbag body 21 breaks the wrapping material (not illustrated) to press and open the airbag cover 9, and is deployed to protrude downward. As illustrated in the two-dot chain line of FIG. 1, the airbag body 21 is completely inflated to cover the inboard side of the windows W1 and W2 and the central pillar CP and the rear pillar RP.

In the head-protecting airbag device M of the embodiment, the airbag 20 includes the airbag body 21, and the tension belt 49 as a connecting piece which is a separate body from the airbag body 21 and has the root end 49*b* connected with the airbag body 21. The coupling piece 51 on the root end 49*b* side of the tension belt 49 is inserted into the pocket portion 45 as the coupling target portion formed in the airbag body 21, and is sewed with the pocket portion 45 by using the suture 55 in the state of being nipped between the inboard side portion 45*a* and the outboard side portion 45*b*. That is, in the head-protecting airbag device M of the embodiment, the root end 49*b* (coupling piece 51) of the tension belt 49 is connected from the inboard side wall 22*a* and the outboard side wall 22*b* of the airbag body 21, and the outer circumferential side of the root end 49*b* is covered with the inboard side portion 45*a* and the outboard side portion 45*b* forming the pocket portion 45. Thus, the inboard side portion 45*a* and the outboard side portion 45*b* can suppress that the periphery separated from the suture in the circumferential periphery of the root end 49*b* (coupling piece 51) of the tension belt 49 turns up. For this reason, when the lower periphery 21*b* is folded to be brought close to the upper periphery 21*a*, the airbag body 21 can be folded compactly by suppressing that an area of the pocket portion 45 coupled with the root end 49b (coupling piece 51) of the tension belt 49 becomes partially bulky.

Particularly, the tension belt 49 is configured such that the root end 49b (coupling piece 51) is connected with an area on the front end 21c side of the airbag body 21, that is, an area which is roll-folded to be overlapped mutually when the airbag body 21 is folded. However, in the head-protecting airbag device M of the embodiment, the outer circumference of the root end 49b (coupling piece 51) is configured to be covered with the inboard side portion 45a and the outboard side portion 45b forming the pocket portion 45, and thus a partial bulkiness can be suppressed. For this reason, in the folding completion body 60, it can be suppressed that the front end 21c of the airbag body 21 coupled with the root end 49b of the tension belt 49 becomes partially bulky.

Therefore, in the head-protecting airbag device M of the embodiment, although the tension belt 49 is provided as a separate connecting piece from the airbag body 21, the airbag 20 can be folded compactly.

Figure 8A:
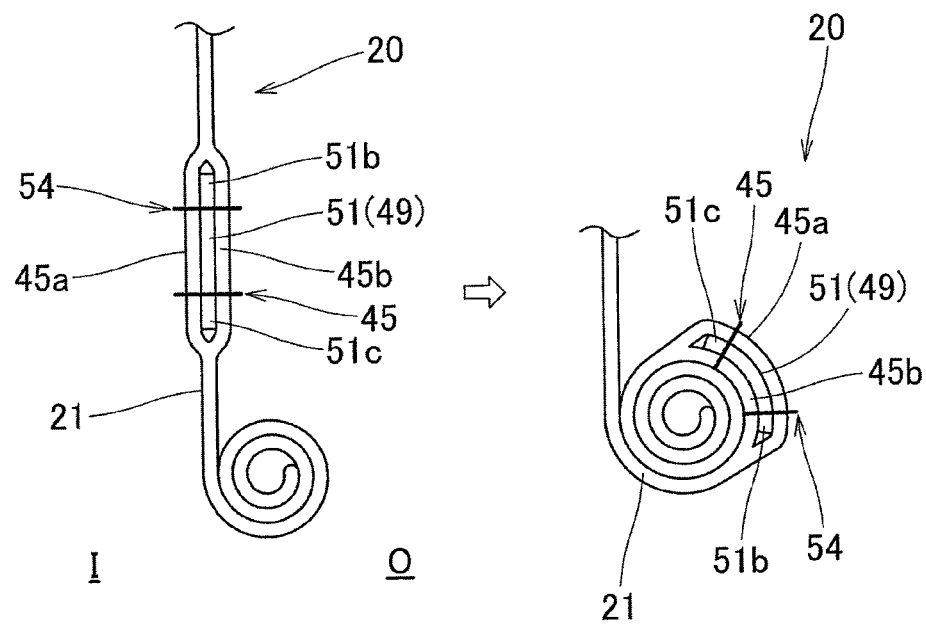
FIGS. 8A and 8B are schematic views for describing folding processes of the airbag in the head-protecting airbag device of the embodiment and the conventional airbag.
Figure 8B:
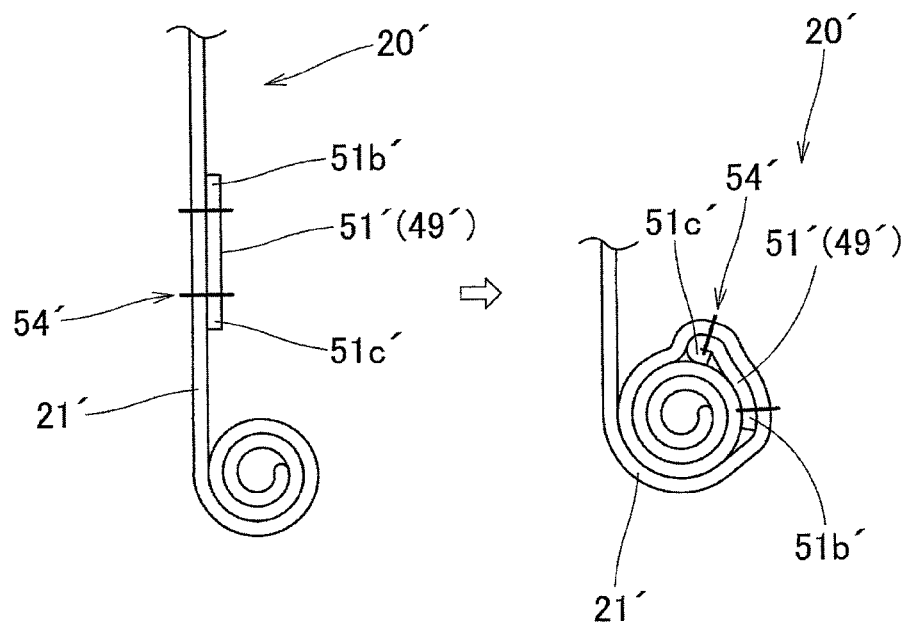

When described in detail, as illustrated in FIG. 8A, in the head-protecting airbag device M of the embodiment, the entire surface of the outer circumferential side (inboard side I and outboard side O) of the root end 49b (coupling piece 51) of the tension belt 49 is covered with the inboard side portion 45a and the outboard side portion 45b forming the pocket portion 45. Thus, the peripheries 51b and 51c separated from the suturing portion 54 in the circumferential periphery of the root end 49b (coupling piece 51) of the tension belt 49 are covered with the inboard side portion 45a and the outboard side portion 45b. It is suppressed that the peripheries 51b and 51c turn up when roll-folded to be wound to the outboard side O, whereby the airbag can be folded compactly. On the contrary, as illustrated in FIG. 8B, in the airbag 20' in which the coupling piece 51' on the root end side of the tension belt 49' is overlapped simply on the airbag body 21' and is sewed therewith, the coupling piece 51' is disposed on the surface (the outboard side O in FIG. 8B) of the airbag body 21' such that peripheries 51b' and 51c' separated from the suturing portion 54' in the circumferential periphery are exposed. When roll-folded to be wound to the outboard side O, the periphery 51c' separated from the suturing portion 54' in the circumferential periphery of the coupling piece 51' turns up to be overlapped with the suturing portion 54', whereby the overlapped area becomes partially largely bulky.

Particularly, in the head-protecting airbag device M of the embodiment, the tension belt 49 is formed in an overlapped shape of four pieces. As illustrated in FIG. 1, the front end 21c of the airbag body 21 (a front end portion 60a of the folding completion body 60) is stored in the vicinity of the boundary between the roof side rail RR and the front pillar FP. In the head-protecting airbag device M of the embodiment, the airbag body 21 is configured to be folded by roll-folding the area of the pocket portion 45 coupled with the root end 49b of the tension belt 49 to be wound to the outboard side. In the case of being folded in a roll-folding manner, if the periphery separated from the suture is exposed in the circumferential periphery of the tension belt, the periphery easily turns up, and easily becomes bulky. However, in the head-protecting airbag device M of the embodiment, the outer circumferential surface of the root end 49b (coupling piece 51) of the tension belt 49 is configured to be covered with the inboard side portion 45a and the outboard side portion 45b in the pocket portion 45, and is not exposed on the outer circumferential surface of the airbag body 21. Thus, it can be reliably prevented that the periphery of the tension belt 49 turns up at the time of roll-folding. For this reason, although the tension belt 49 is configured to be thick with plural pieces of members overlapped, the airbag body 21 is suppressed not to be bulky, and can be folded compactly. Thus, the airbag body 21 can be smoothly stored even in a narrow storage portion of the roof side rail RR near the boundary between the roof side rail RR and the front pillar FP.

In the head-protecting airbag device M of the embodiment, a coupling target portion coupling the root end 49b (coupling piece 51) of the tension belt 49 is formed from the pocket portion 45 having the insertion opening 46 through which the root end 49b of the tension belt 49 can be inserted inside. Therefore, only by inserting the root end 49b of the tension belt 49 into the pocket portion 45, the tension belt 49 can be easily positioned with respect to the airbag body 21, and the tension belt 49 is more easily coupled with the airbag body 21. In the airbag body 21 of the embodiment, the general portion 32 of the non-inflow portion 30 is formed adjacent to the both upper and lower sides and the rear side of the pocket portion 45. The general portion 32 is configured to be separated into the inboard side portion 32a and the outboard side portion 32b except a portion partially contacting with the binding portion 33. However, the binding portions 33 are provided at an interval of about 5 mm, and the interval becomes narrow with respect to the coupling piece 51 of the tension belt 49, that is, the pocket portion 45. Specifically, in the case of the embodiment, as illustrated in FIG. 4, the pocket portion 45 is set to have a vertical width dimension L1 of 50 mm, the coupling piece 51 of the tension belt 49 is set to have a vertical width dimension L2 of 42 mm, and the width dimensions are sufficiently wide with respect to an interval of providing the binding portion 33. Thus, a position where the tension belt 49 is inserted into the pocket portion 45 is determined without hindrance, and the tension belt 49 can be easily positioned in the airbag body 21 only by inserting the root end 49b of the tension belt 49 into the pocket portion 45.

Figure 9:
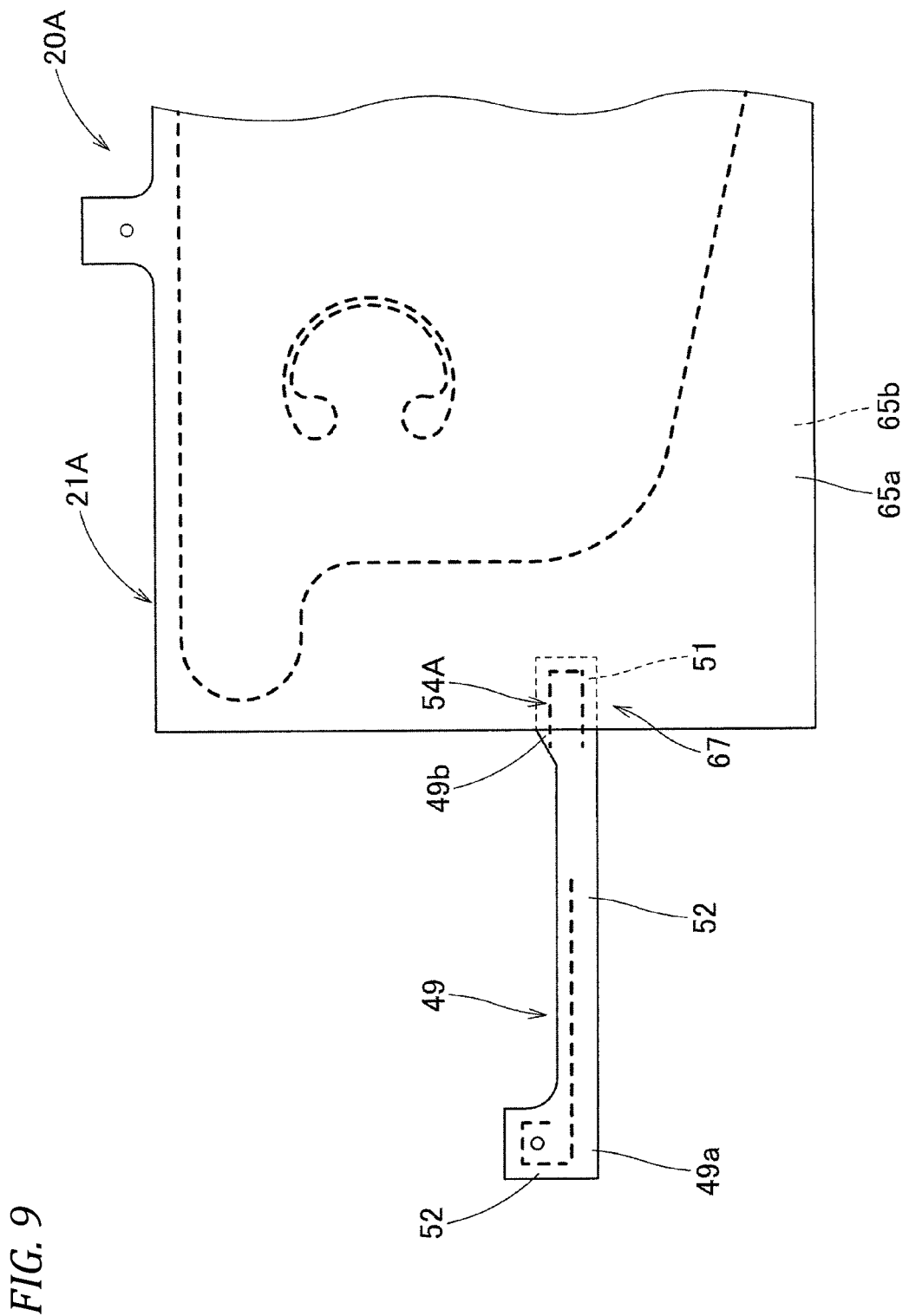
FIG. 9 is a partially enlarged front view illustrating a state where an airbag of another embodiment of the invention is deployed flatly.

Without regard to such a point, in a case where the airbag body is not configured by double-weaving, and is configured as a sutured airbag configured by sewing two pieces of basic fabrics in an overlapped state in a predetermined position, similarly to the airbag 20A illustrated in FIG. 9, the coupling piece 51 may be sutured with the inboard side wall 65a and the outboard side wall 65b by using a suture in a state where a predetermined front-end position of the airbag body 65 is set as a coupling target portion 67, and the coupling piece 51 of the tension belt 49 is nipped between the inboard side wall 65a and the outboard side wall 65b of the airbag body 65 forming the coupling target portion 67.

Figure 10A:
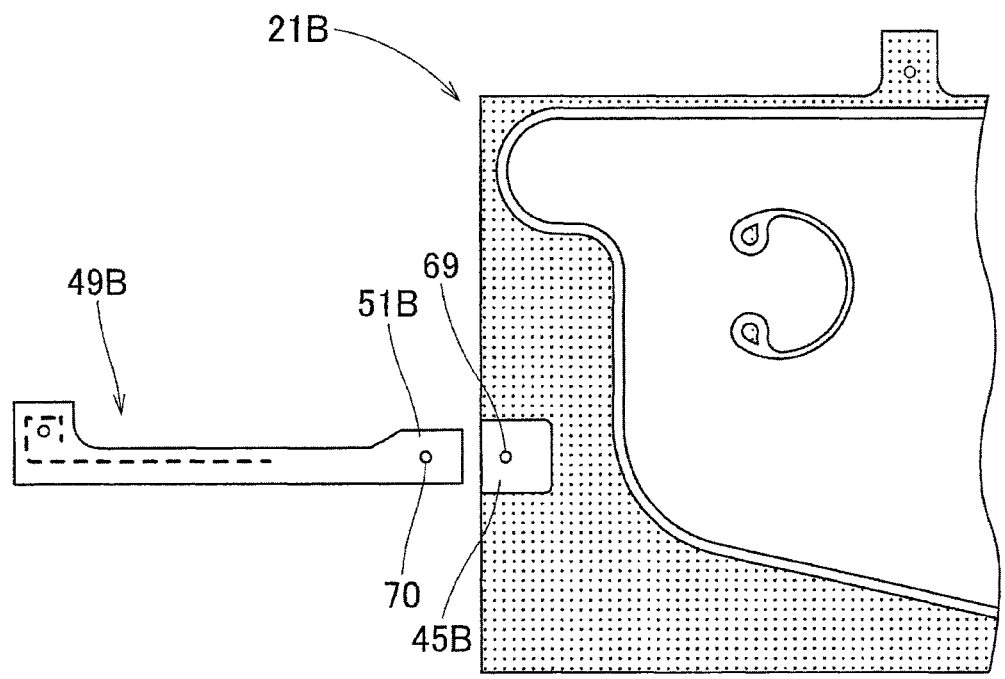
FIGS. 10A and 10B are partially enlarged front views illustrating a state where an airbag of still another embodiment of the invention is deployed flatly.
Figure 10B:
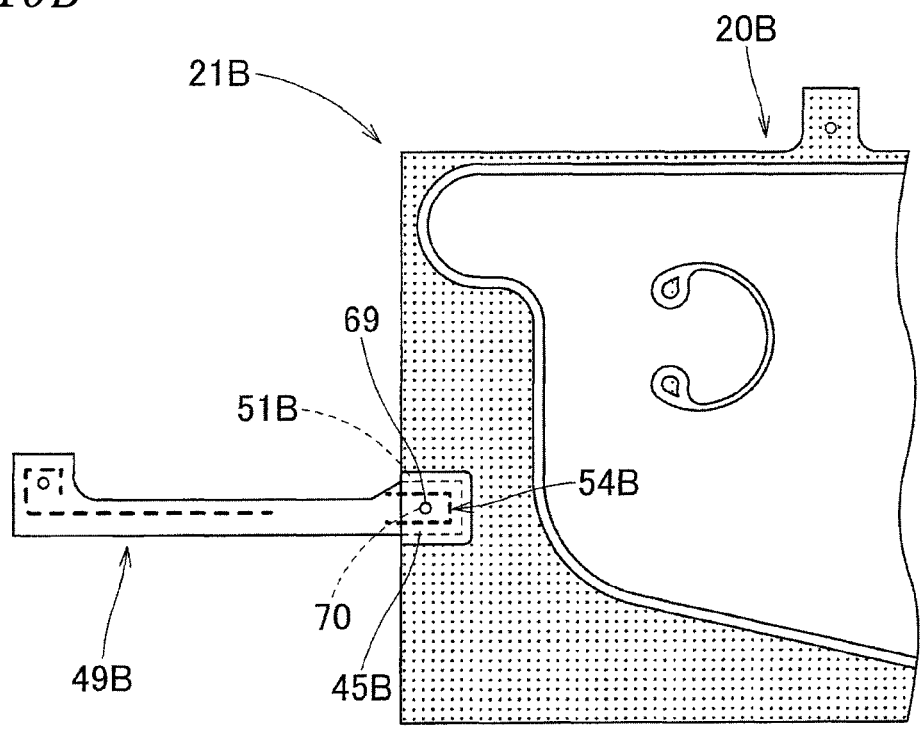

Similarly to the airbag 20B illustrated in FIGS. 10A and 10B, the pocket portion 45B of the airbag body 21B and a coupling piece 51B of the tension belt 49B may be formed to have insertion holes 69 and 70 for inserting a positioning tool (not illustrated), respectively. With such a configuration, the coupling piece 51B and the pocket portion 45B can be easily positioned at the time of suturing operation for forming the suturing portion 54B in a state where the coupling piece 51B is inserted into the pocket portion 45B.

Figure 11:
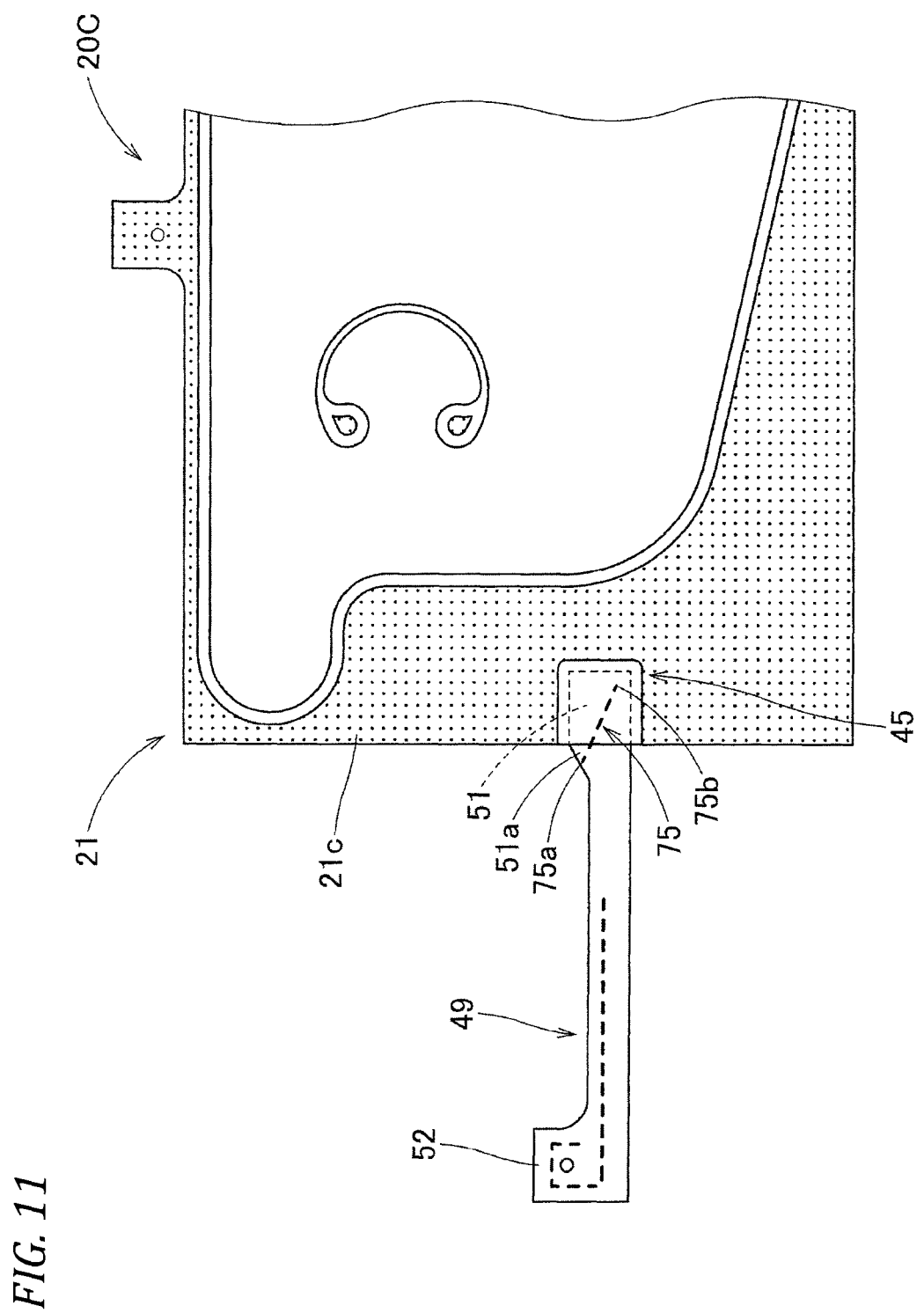
FIG. 11 is a partially enlarged front view illustrating a state where an airbag of still another embodiment of the invention is deployed flatly.
Figure 12:
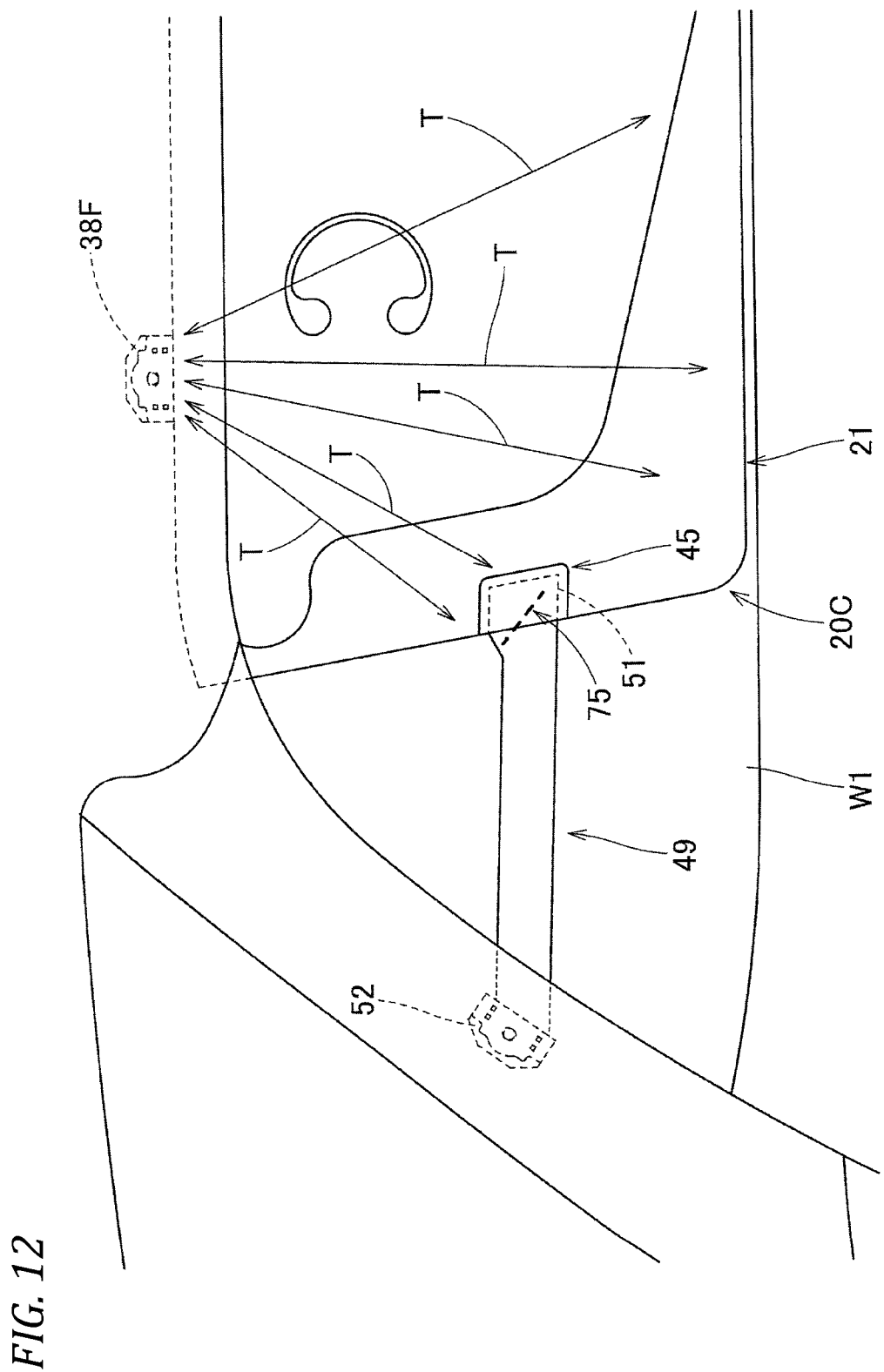
FIG. 12 is a partially enlarged front view schematically illustrating a state where the airbag is completely inflated in the head-protecting airbag device using the airbag of FIG. 11 when viewed from the inboard side.

Similarly to the airbag 20C illustrated in FIG. 11, one suturing portion 75 which sews the coupling piece 51 forming the root end 49b of the tension belt 49 with the pocket portion 45 may be configured to be disposed in a shape of a straight line tilted in the front and rear direction. In the airbag 20C illustrated in FIG. 11, the suturing portion 75 is formed such that the front end 75a is positioned on the upper side, and the rear end 75b is positioned on the lower side. Specifically, the front end 75a is formed to go into the front end portion 51a of the coupling piece 51 protruding forward from the pocket portion 45. When the airbag 20C is configured as above, it can be prevented that the suturing portion 75 is disposed in an overlapped state when the airbag body 21 is folded such that the lower periphery is brought close to the upper periphery. Thus, in the folding completion body, it can be further suppressed that the front end 21c of the airbag body 21 coupled with the root end 49b of the tension belt 49 becomes bulky. In the airbag 20C, the suturing portion 75 is disposed such that the rear is inclined downward. Thus, as illustrated in FIG. 12, when the inflated airbag body 21 receives the head of an occupant (not illustrated) at the time of inflation completion of the airbag body 21, and a radial tension T acts while an end-side mounting portion 38F disposed on the tension belt 49 side in the mounting portions 38 which mounts the upper periphery of the airbag body 21 in the upper periphery of the window W1 is set as a center, the suturing portion 75 is intersected with the tension T. For this reason, the suturing portion 75 which couples the root end 49b of the tension belt 49 with the airbag body 21 is disposed to approximate to a tangent with respect to an arc shape centered on the end-side mounting portion 38F. Thus, the tension T can be received over almost the entire long area of the suturing portion, and a stress concentration hardly occurs on a portion of the suturing portion 75. Without regard to such a point, the suturing portion may be configured to be disposed generally along the tension such that the front side is inclined downward.

Figure 19:
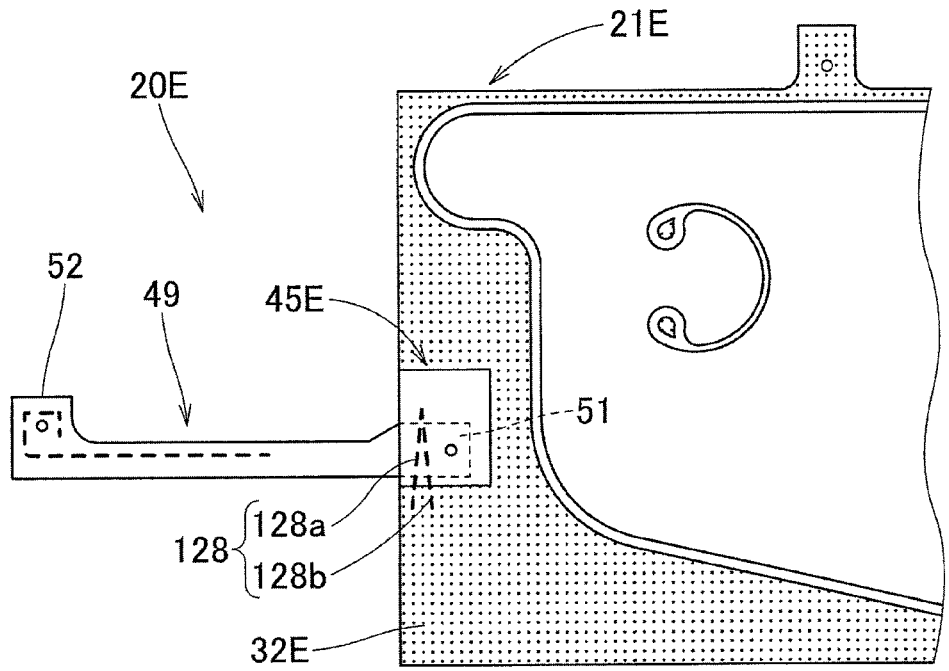
FIG. 19 is a partially enlarged front view illustrating a state where an airbag of still another embodiment of the invention is deployed flatly.

Similarly to the airbag 20E illustrated in FIG. 19, the suturing portion 128 which sews the coupling piece 51 forming the root end 49b of the tension belt 49 with a pocket portion 45E may be configured such that two of linear portions 128a and 128b disposed to be tilted in the front and rear direction are disposed in a zigzag shape continuously in the front and rear direction. Specifically, the suturing portion 128 is configured such that the linear portion 128a in which the rear thereof is tilted upward, and the linear portion 128b in which the rear is tilted downward symmetrically to the linear portion 128a are formed in a substantially reverse V shape in which the upper ends are connected with each other. The linear portions 128a and 128b are disposed not to be overlapped vertically. In the airbag 20E, with regard to operability of inserting the coupling piece 51, the pocket portion 45E formed in the airbag body 21E is configured to have a vertical width dimension larger than that of the above-described pocket portion 45 of the airbag 20. In the airbag 20E, the coupling piece 51 is stored in the lower area of the pocket portion 45E. The suturing portion 128 is configured such that the lower end protrudes downward from the pocket portion 45E to go to the area of a general portion 32E beneath the pocket portion 45E. As above, although the suturing portion 128 is configured such that the plurality of linear portions 128a and 128b tilted in the front and rear direction are disposed in the front and rear direction, when the airbag body 21E is folded such that the lower periphery is brought close to the upper periphery, it can be prevented that the linear portions 128a and 128b forming the suturing portion 128 are disposed to be overlapped mutually. Thus, in the folding completion body, it can be suppressed that the end of the airbag body 21E coupled with the root end 49b of the tension belt 49 becomes bulky.

Figure 20:
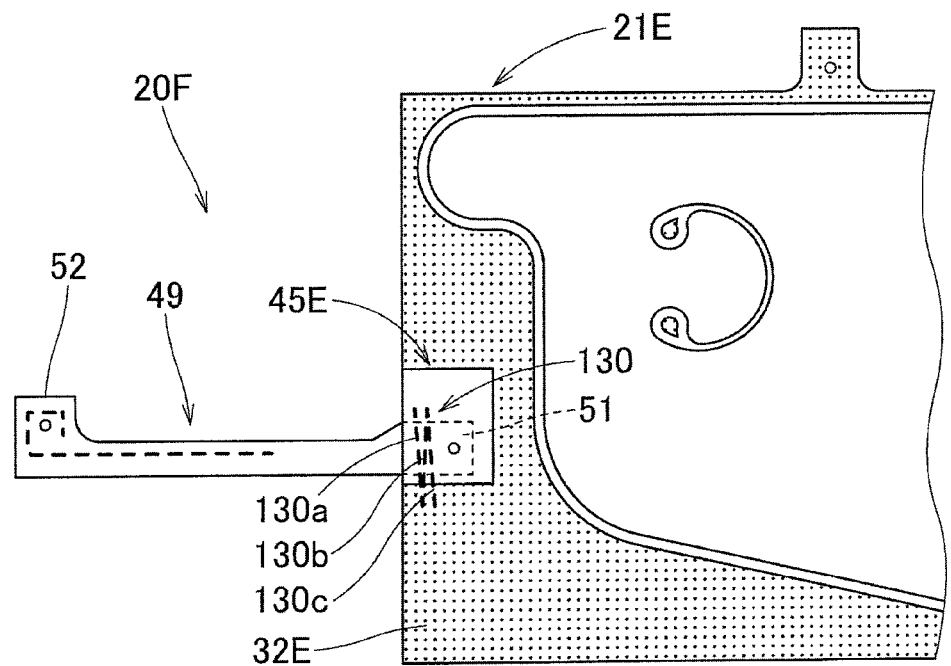
FIG. 20 is a partially enlarged front view illustrating a state where an airbag of still another embodiment of the invention is deployed flatly.
Figure 21:
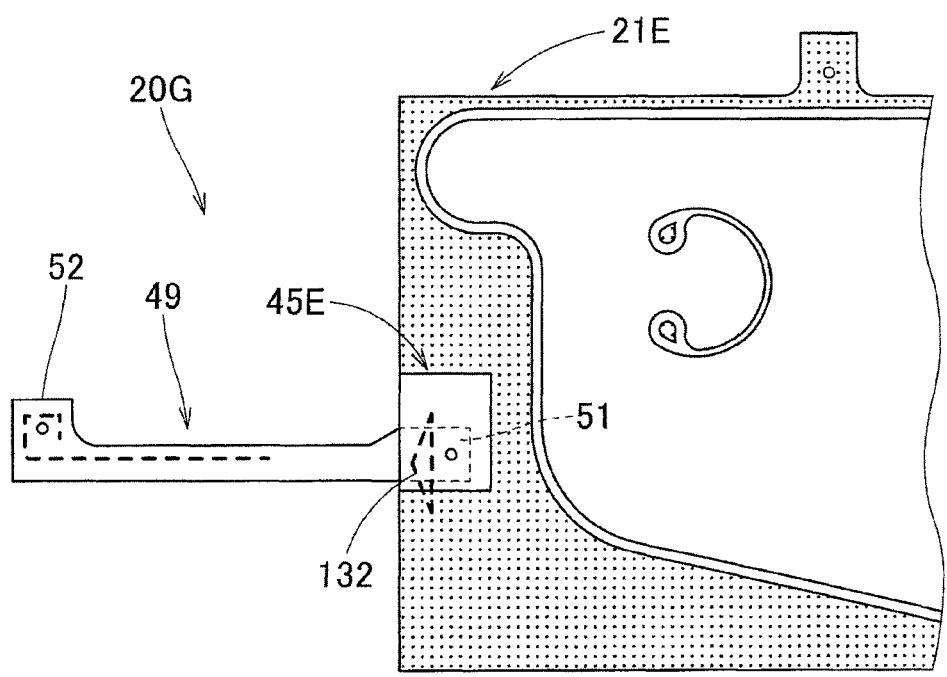
FIG. 21 is a partially enlarged front view illustrating a state where an airbag of still another embodiment of the invention is deployed flatly.

In the case of the suturing portion disposed with a plurality of linear portions, the number of the linear portions is not limited to two. Similarly to the suturing portion 130 disposed in the airbag 20F illustrated in FIG. 20, three of linear portions 130a, 130b, and 130c may be configured to be connected with each other in a zigzag shape. Also in the airbag 20F illustrated in FIG. 20, the linear portions 130a, 130b, and 130c are set to have a small vertically tilted angle, and is disposed to be tilted in the front and rear direction (vertically). The linear portions 130a, 130b, and 130c are disposed not to be overlapped vertically, so that the overlap at the time of folding is prevented. The suturing portion 130 also is configured such that the lower end protrudes downward from the pocket portion 45E to go to the area of the general portion 32E beneath the pocket portion 45E. Similarly to the airbag 20G illustrated in FIG. 21, the suturing portion disposed to protrude downward from the pocket portion 45E can be exemplified by the suturing portion 132 of an isosceles triangle shape in which the bottom is disposed on the rear side generally along a vertical direction.

In the embodiment, the tension belt 49 as the connecting piece is disposed on the front end 21c side of the airbag body 21. However, the airbag may be configured such that the tension belt is disposed on the rear end side of the airbag body.

In the embodiment, the tension belt 49 as the connecting piece is configured to be disposed to extend forward from the root end 49b (coupling piece 51) connected with the front end 21c of the airbag body 21. However, a position where the tension belt as the connecting piece is disposed and a shape of the tension belt are not limited to the above-described airbag, and the invention can be applied also to tensions belts 93 and 111 used in airbags 80 and 100 having a type described below.

Figure 13:
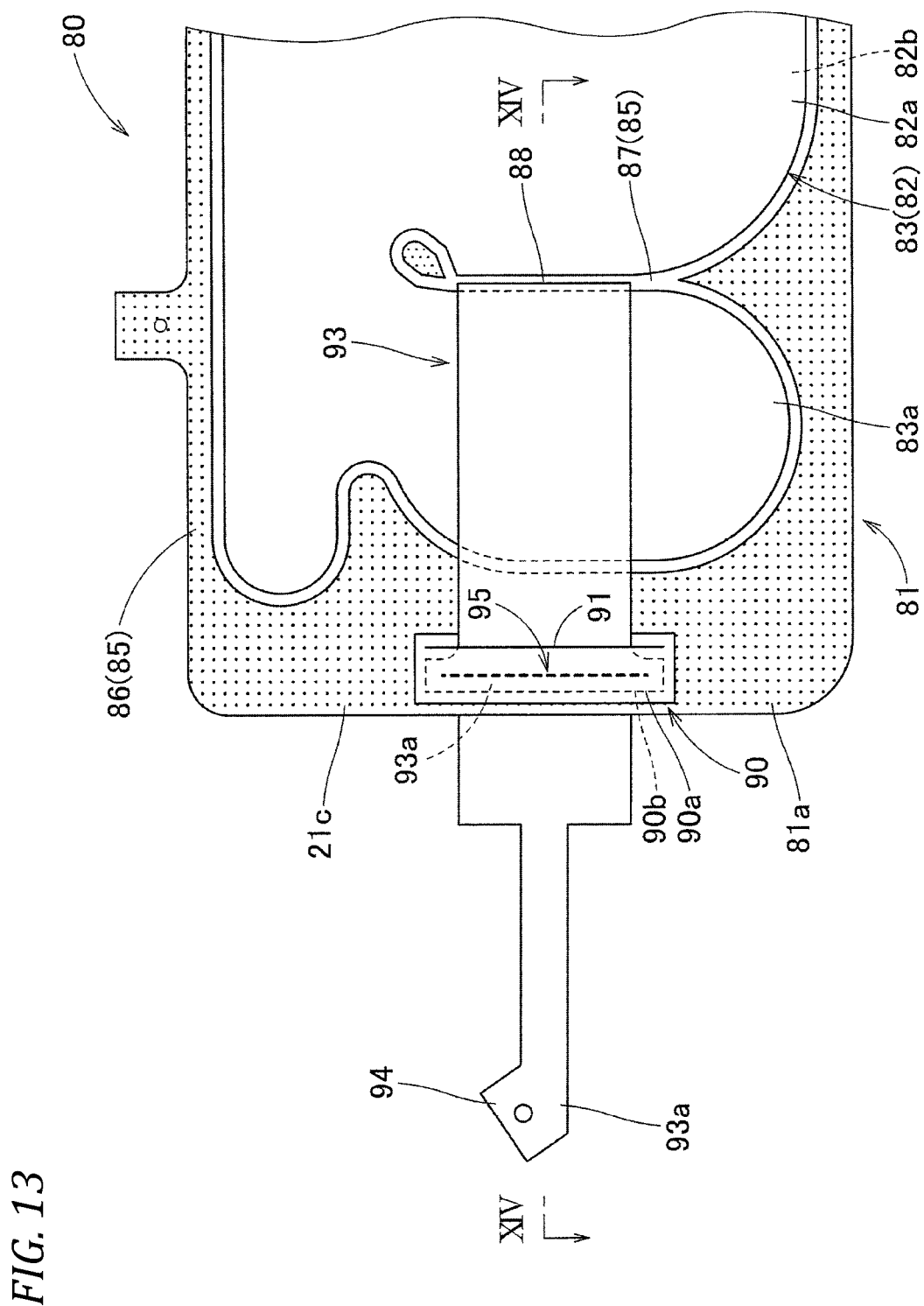
FIG. 13 is a partially enlarged front view illustrating a state where an airbag of still another embodiment of the invention is deployed flatly.
Figure 14:
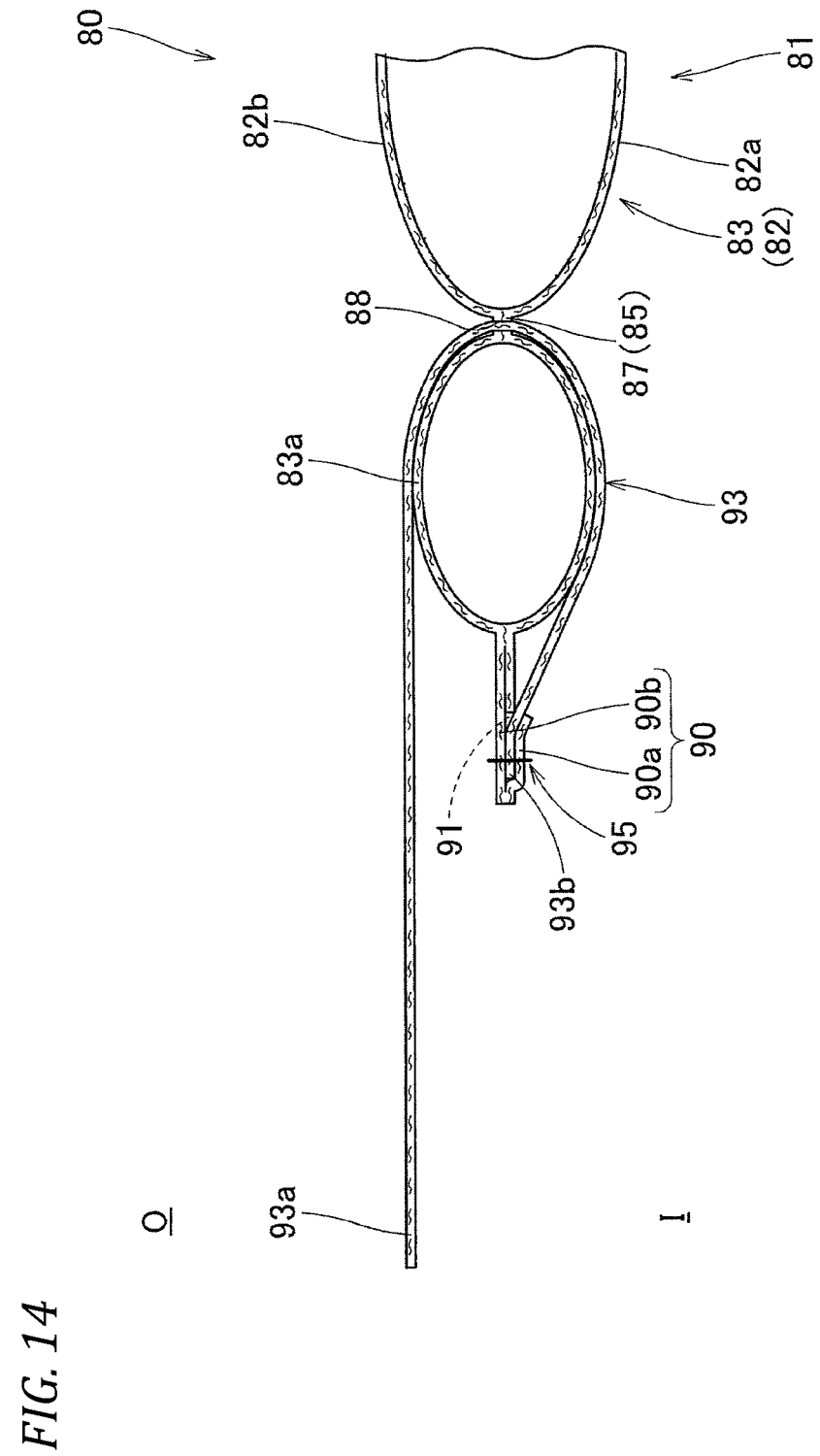
FIG. 14 is a sectional view taken along line XIV-XIV of FIG. 13.

In the airbag 80 illustrated in FIGS. 13 and 14, a pocket portion 90 as a coupling target portion in which the rear end side not the front end side is open is disposed in a front periphery 81a of the airbag body 81. A root end 93b of the tension belt 93 disposed to cover a front end portion of the airbag body 81 (a front end portion 83a of the front-seat protecting portion 83) from the inboard side I to the outboard side O is configured to be sewed with the pocket portion 90. When described in detail, similarly to the above-described airbag body 21, the airbag body 81 of the airbag 80 illustrated in FIGS. 13 and 14 is formed by double-weaving. Similarly to the above-described airbag body 21, the pocket portion 90 is formed by providing an area without a binding portion in an area of a circumferential periphery 86 on the front peripheral side which is the non-inflow portion 85. Similarly to the pocket portion 45 of the above-described airbag body 21, the pocket portion 90 also includes an inboard side portion 90a connected from the inboard side wall 82a of the gas inflow portion 82 and an outboard side portion 90b connected from the outboard side wall 82b. In the airbag body 81, a slit-shaped notch is formed such that the pocket portion 90 can be partially divided into the inboard side portion 90a and the outboard side portion 90b, and thus the root end 93b of the tension belt 93 can be inserted into the rear periphery of the inboard side portion 90a forming the pocket portion 90. That is, the notch forms an insertion opening 91 into which the root end 93b of the tension belt 93 can be inserted. In the airbag body 81, a partition portion 87 disposed generally along the vertical direction to partition the front-seat protecting portion 83 in the front and rear direction is formed in the area of the front-seat protecting portion 83 as the gas inflow portion 82, and a slit 88 into which the tension belt 93 can be inserted is provided in the partition portion 87. The tension belt 93 is configured such that the central portion is inserted into the slit 88, an area on the root end is positioned on the inboard side I of the front end portion 83a in the front-seat protecting portion 83, and an area on the tip side is positioned on the outboard side O of the front end portion 83a. The tension belt 93 includes a mounting portion 94 on the tip 93a. In a state where the root end 93b is inserted through the insertion opening 91 into the pocket portion 90, and is nipped between the inboard side portion 90a and the outboard side portion 90b of the pocket portion 90, the tension belt 93 is sutured with the inboard side portion 90a and the outboard side portion 90b by using the suture to be connected to the airbag body 81. The suturing portion 95 which sews the root end 93b of the tension belt 93 with the pocket portion 90 is formed in a shape of a straight line generally along the vertical direction.

Figure 15:
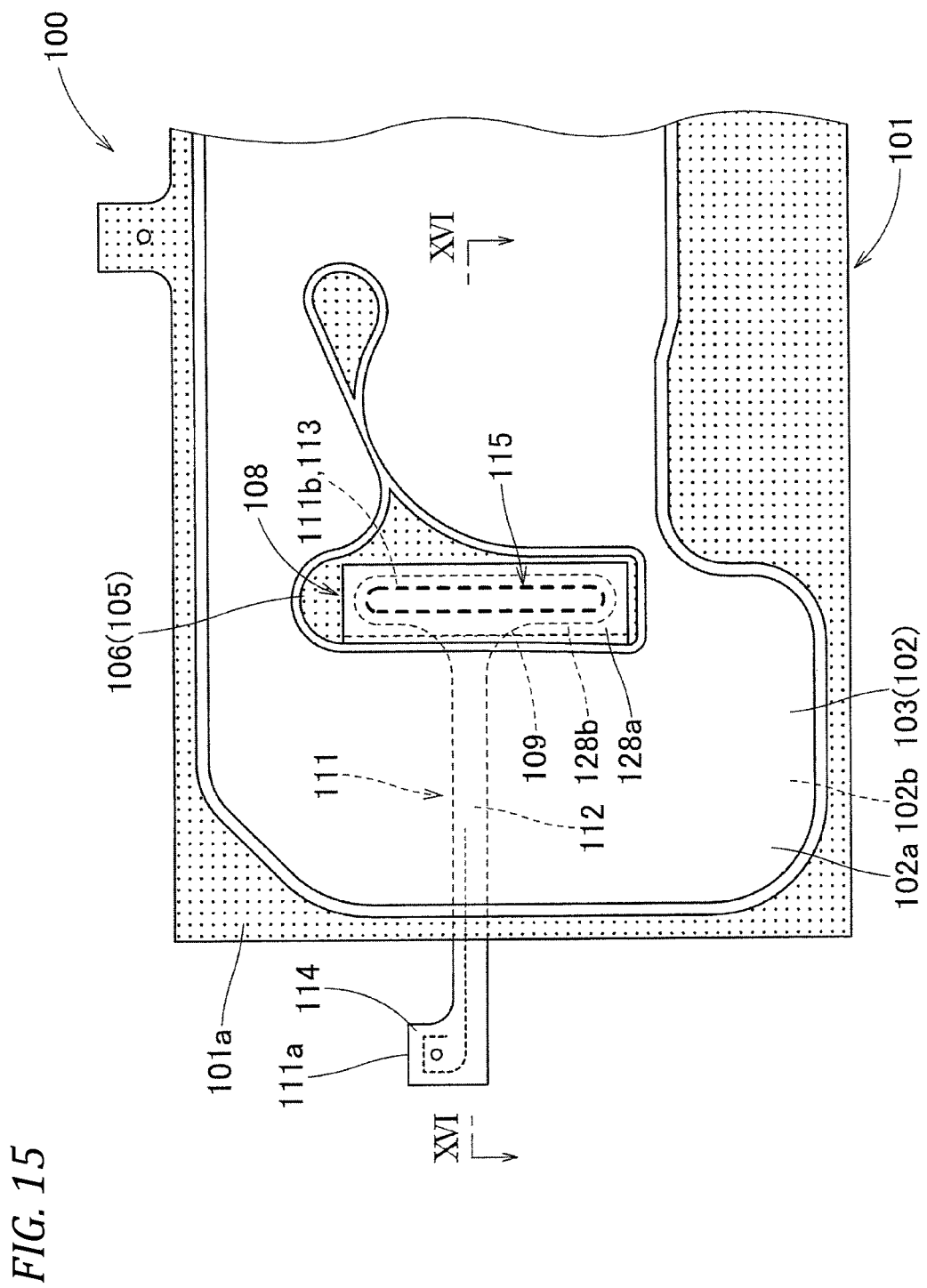
FIG. 15 is a partially enlarged front view illustrating a state where an airbag of still another embodiment of the invention is deployed flatly.
Figure 16:
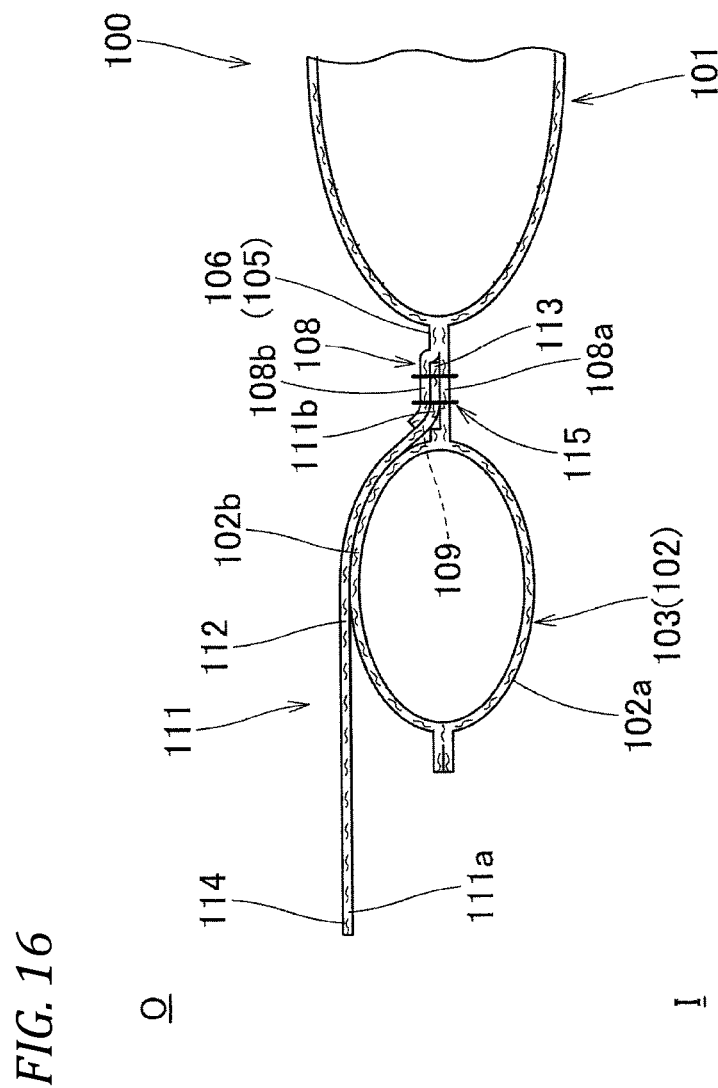
FIG. 16 is a sectional view taken along line XVI-XVI of FIG. 15.

In the airbag 100 illustrated in FIGS. 15 and 16, the airbag body 101 is configured such that a pocket portion 108 as the coupling target portion is disposed, not on the front peripheral side, in a partition portion 106 formed near the rear side of an auxiliary inflatable portion 103 (gas inflow portion 102) disposed on the front end 101a side of the airbag body 101, and a root end 111b of the tension belt 111 which is disposed to cover the outboard side O of the airbag body 101 and extends forward is sewed with the pocket portion 108. When described in detail, similarly to the above-described airbag body 21, the airbag body 101 of the airbag 100 illustrated in FIGS. 15 and 16 is formed by double-weaving. Similarly to the above-described airbag body 21, an area without the binding portion is provided in the partition portion 106 as the non-inflow portion 105 to form the pocket portion 108. Similarly to the pocket portion 45 in the above-described airbag body 21, the pocket portion 108 also includes an inboard side portion 108a connected from the inboard side wall 102a of the gas inflow portion 102 and an outboard side portion 108b connected from the outboard side wall 102b. In the airbag body 101, a slit-shaped notch is formed such that the root end 111b of the tension belt 111 can be inserted to the front peripheral side of the outboard side portion 108b forming the pocket portion 108, and the pocket portion 108 can be partially divided into an inboard side portion 108a and the outboard side portion 108b. That is, the notch forms an insertion opening 109 through which the root end 111b of the tension belt 111 can be inserted inside. The tension belt 111 includes a coupling base portion 113 formed to extend on the root end 111b side generally along the vertical direction, a belt body 112 extending forward from the substantially vertical center of the coupling base portion 113, and a mounting portion 114 on the tip 111a side. The belt body 112 is positioned on the outboard side O of the auxiliary inflatable portion 103, and the coupling base portion 113 on the root end 111b side is inserted through the insertion opening 109 into the pocket portion 108, and is sutured with the inboard side portion 108a and the outboard side portion 108b by using the suture in the state of being nipped between the inboard side portion 108a and the outboard side portion 108b of the pocket portion 108, whereby the tension belt 111 is connected with the airbag body 101. The suturing portion 115 which sews the coupling base portion 113 with the pocket portion 108 is formed in an elliptical shape in which a longitudinal direction is generally along the vertical direction.

Figure 17:
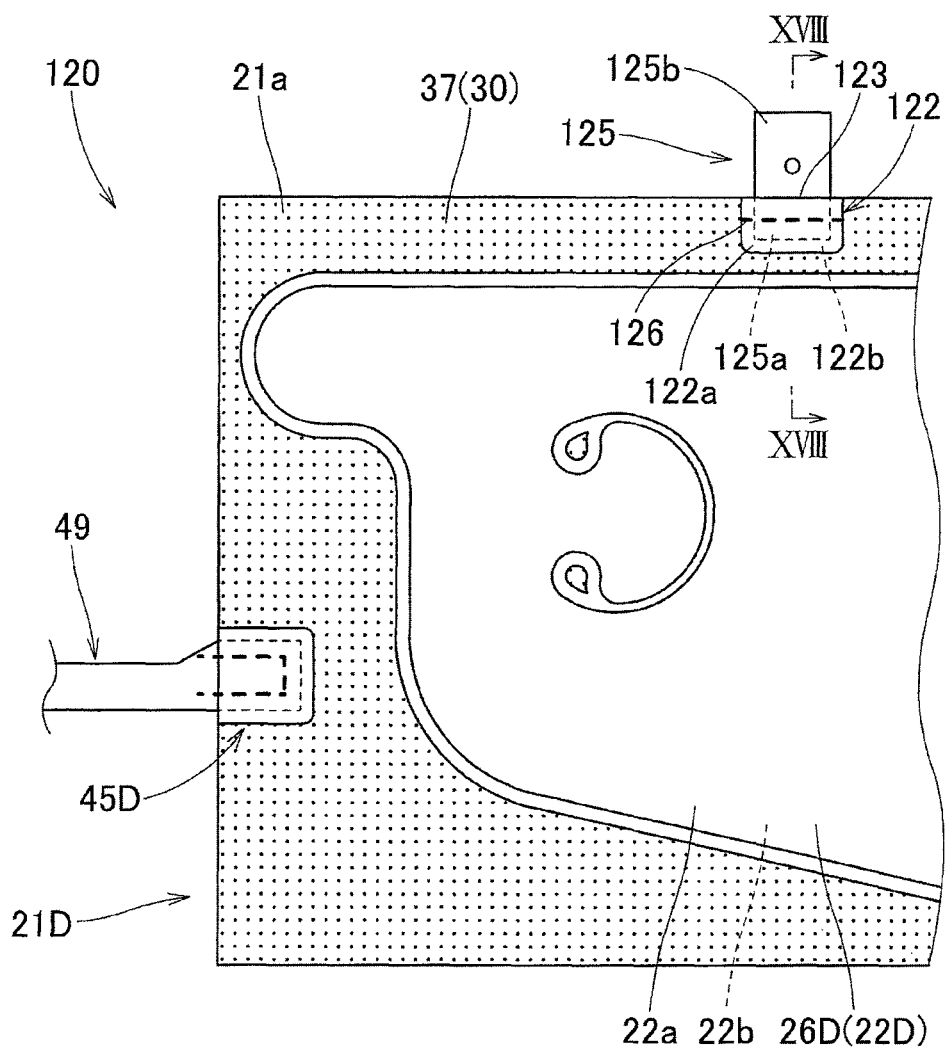
FIG. 17 is a partially enlarged front view illustrating a state where an airbag of still another embodiment of the invention is deployed flatly.
Figure 18:
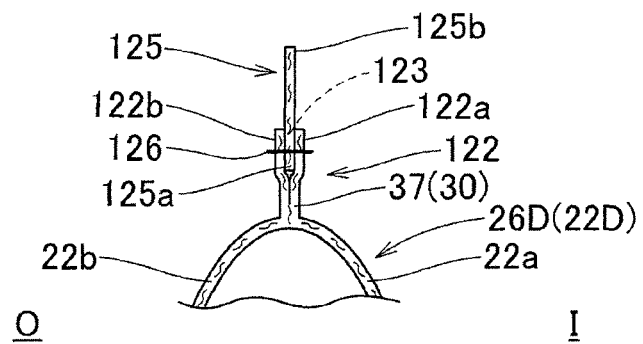
FIG. 18 is a sectional view taken along line XVIII-XVIII of FIG. 17.

In the embodiment, the airbag body is folded by roll-folding the lower periphery to be wound to the outboard side. However, the folding of the airbag is not limited to the embodiment, and the airbag may be configured to be folded in a bellows-folding manner by attaching a plurality of creases in the front and rear direction. Further, the airbag body may be folded by roll-folding the entire vertical area to the upper periphery. As above, in a case where the entire airbag body is folded in a roll-folding manner, and in a case where a portion (mounting portion) which mounts the upper periphery of the airbag body in the body is a separate body from the airbag body, the mounting piece may serve as a connecting piece. That is, similarly to the airbag 120 illustrated in FIGS. 17 and 18, a pocket portion 122 as a coupling target portion in which the upper periphery is open such that the root end (lower periphery 125a) of a mounting piece 125 as the connecting piece can be inserted thereinto may be disposed on the upper periphery 21a side of an airbag body 21D. The mounting piece 125 as the connecting piece which is a separate body from the airbag body 21D may be inserted through an insertion opening 123 on the upper end side into the pocket portion 122, and be sutured with an inboard side portion 122a and an outboard side portion 122b by using the suture in the state of being nipped between the inboard side portion 122a and the outboard side portion 122b of the pocket portion 122, thereby being connected with the airbag body 21D. Similarly to the mounting portion 38 in the above-described airbag body 21, the mounting piece 125 is configured such that the upper end which is on the tip 125b side is mounted on the upper peripheral side of the window. The suturing portion 126 which sews the lower periphery 125a of the mounting piece 125 with the pocket portion 122 is formed in a shape of a straight line generally along the front and rear direction. The airbag body 21D of the airbag 120 illustrated in FIGS. 17 and 18, has the same configuration as the above-described airbag body except that the mounting piece is a separate body, and the pocket portion is provided to mount the mounting piece.

What is claimed is:
1. A head-protecting airbag device comprising:
an airbag body; and
a connecting piece which is a separate body from the airbag body and is formed of a sheet material with flexibility, and in which a root end is connected with the airbag body, and a tip protrudes from the airbag body to be mounted in a circumferential periphery of a window, wherein:
the airbag body and the connecting piece constitute an airbag having a bag shape inflatable to cover an inboard side of the window of a vehicle when an inflation gas from an inflator flows inside, the airbag being stored on an upper peripheral side of the window as a long folding completion body formed by folding a lower periphery to be brought close to an upper periphery in a flatly-deployed state;
the airbag body includes an inboard side wall disposed on the inboard side at a time of inflation completion, an outboard side wall disposed on an outboard side, and a coupling target portion coupling the connecting piece;
the coupling target portion is configured to be divided into an inboard side portion, which is disposed on the inboard side at the time of inflation completion to be connected from the inboard side wall, and an outboard side portion which is disposed on the outboard side to be connected from the outboard side wall; and
the root end of the connecting piece is nipped between the inboard side portion and the outboard side portion, and is coupled with the inboard side portion and the outboard side portion so as to be connected with the airbag body,
further comprising a suturing portion which sews the root end with the coupling target portion, the suturing portion extends beyond an area, where the connecting piece and the airbag body are overlapped,
wherein the connecting piece is a tension belt in which the root end is connected with one end of the airbag body in a front and rear direction, and the tip is fixed to a body of the vehicle in the circumferential periphery of the window separated from the one end of the airbag body in the front and rear direction, the root end of the connecting piece is sewn with the inboard side portion and the outboard side portion by using the suturing portion to be connected with the airbag body;

the suturing portion is configured such that a plurality of linear portions disposed to be tilted in the front and rear direction are disposed in a zigzag shape continuously in the front and rear direction; and the linear portions are disposed not to be overlapped vertically.

2. The head-protecting airbag device according to claim 1, wherein the airbag body is formed as a sutured airbag configured by sewing two pieces of basic fabrics in an overlapped state in a predetermined position.

3. The head-protecting airbag device according to claim 1, wherein the connecting piece is a mounting piece in which the root end is connected with an upper periphery of the airbag body to protrude upward from the airbag body, and the tip is mounted on the upper peripheral side of the window.

4. The head-protecting airbag device according to claim 1, wherein a hole for positioning is formed inside the area where the connecting piece and the airbag body are overlapped.

5. The head-protecting airbag device according to claim 1, wherein the suturing portion is configured such that the linear portions have lower ends that protrude downward below the root end of the connecting piece.

6. The head-protecting airbag device according to claim 1, wherein a number of the linear portions is limited to two.

7. The head-protecting airbag device according to claim 1, wherein a number of the linear portions is limited to three.

8. The head-protecting airbag device according to claim 1, wherein a number of the linear portions is at least two.

9. The head-protecting airbag device according to claim 1, wherein the airbag body is formed by double-weaving.

10. The head-protecting airbag device according to claim 9, wherein the coupling target portion has a pocket shape having an insertion opening through which the root end of the connecting piece is insertable.

* * * * *